(12) United States Patent
Dokai et al.

(10) Patent No.: US 8,081,125 B2
(45) Date of Patent: *Dec. 20, 2011

(54) ANTENNA AND RADIO IC DEVICE

(75) Inventors: Yuya Dokai, Nagaokakyo (JP); Noboru Kato, Moriyama (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 346 days.

This patent is subject to a terminal disclaimer.

(21) Appl. No.: 12/350,307

(22) Filed: Jan. 8, 2009

(65) Prior Publication Data

US 2009/0109102 A1 Apr. 30, 2009

Related U.S. Application Data

(63) Continuation of application No. PCT/JP2007/063465, filed on Jul. 5, 2007.

(30) Foreign Application Priority Data

| Jul. 11, 2006 | (JP) | 2006-190992 |
| Apr. 9, 2007 | (JP) | 2007-101842 |

(51) Int. Cl.
*H01Q 1/24* (2006.01)

(52) U.S. Cl. ............... 343/702; 343/700 MS

(58) Field of Classification Search .......... 343/702, 343/700 MS
See application file for complete search history.

(56) References Cited

U.S. PATENT DOCUMENTS

| 3,364,564 A | 1/1968 | Kurtz et al. |
| 4,794,397 A | 12/1988 | Ohe et al. |
| 5,232,765 A | 8/1993 | Yano et al. |
| 5,253,969 A | 10/1993 | Richert |
| 5,337,063 A | 8/1994 | Takahira |
| 5,374,937 A | 12/1994 | Tsunekawa et al. |
| 5,399,060 A | 3/1995 | Richert |
| 5,491,483 A | 2/1996 | D'Hont |
| 5,757,074 A | 5/1998 | Matloubian et al. |

(Continued)

FOREIGN PATENT DOCUMENTS

EP 0 977 145 A2 2/2000

(Continued)

OTHER PUBLICATIONS

Official Communication issued in International Patent Application No. PCT/JP2007/063465, mailed on Oct. 16, 2007.

(Continued)

*Primary Examiner* — Hoanganh Le
(74) *Attorney, Agent, or Firm* — Keating & Bennett, LLP

(57) ABSTRACT

An antenna includes a feeder terminal and a resonance circuit. The resonance circuit is defined by a capacitance element and an inductance element and includes first and second radiation plates. The capacitance element is electromagnetically coupled to the first radiation plate, and the inductance element is electromagnetically coupled to the second radiation plate. A radio IC device includes an electromagnetic coupling module including a feeder circuit substrate on which a radio IC chip is mounted, and radiation plates. The feeder circuit substrate includes an inductance element and a capacitance element. One of the radiation plates faces and is magnetically coupled to the inductance element. The other radiation plate faces and is electrically coupled to the capacitance element. The radio IC chip is operated by signals received by the radiation plates, and a response signal from the radio IC chip is radiated from the radiation plates.

13 Claims, 14 Drawing Sheets

U.S. PATENT DOCUMENTS

| | | | |
|---|---|---|---|
| 5,903,239 A | 5/1999 | Takahashi et al. | |
| 5,936,150 A | 8/1999 | Kobrin et al. | |
| 5,955,723 A | 9/1999 | Reiner | |
| 5,995,006 A | 11/1999 | Walsh | |
| 6,104,311 A | 8/2000 | Lastinger | |
| 6,107,920 A | 8/2000 | Eberhardt et al. | |
| 6,172,608 B1 | 1/2001 | Cole | |
| 6,181,287 B1 | 1/2001 | Beigel | |
| 6,190,942 B1 | 2/2001 | Wilm et al. | |
| 6,259,369 B1 | 7/2001 | Monico | |
| 6,271,803 B1 | 8/2001 | Watanabe et al. | |
| 6,335,686 B1 | 1/2002 | Goff et al. | |
| 6,362,784 B1 | 3/2002 | Kane et al. | |
| 6,367,143 B1 | 4/2002 | Sugimura | |
| 6,378,774 B1 | 4/2002 | Emori et al. | |
| 6,406,990 B1 | 6/2002 | Kawai | |
| 6,448,874 B1 | 9/2002 | Shiino et al. | |
| 6,462,716 B1 | 10/2002 | Kushihi | |
| 6,542,050 B1 | 4/2003 | Arai et al. | |
| 6,600,459 B2 | 7/2003 | Yokoshima et al. | |
| 6,634,564 B2 | 10/2003 | Kuramochi | |
| 6,664,645 B2 | 12/2003 | Kawai | |
| 6,763,254 B2 | 7/2004 | Nishikawa | |
| 6,828,881 B2 | 12/2004 | Mizutani et al. | |
| 6,927,738 B2 | 8/2005 | Senba et al. | |
| 6,963,729 B2 | 11/2005 | Uozumi | |
| 7,088,307 B2 | 8/2006 | Imaizumi | |
| 7,112,952 B2 | 9/2006 | Arai et al. | |
| 7,119,693 B1 | 10/2006 | Devilbiss | |
| 7,129,834 B2 | 10/2006 | Naruse et al. | |
| 7,248,221 B2 | 7/2007 | Kai et al. | |
| 7,250,910 B2 | 7/2007 | Yoshikawa et al. | |
| 7,276,929 B2 | 10/2007 | Arai et al. | |
| 7,317,396 B2 | 1/2008 | Ujino | |
| 7,405,664 B2 | 7/2008 | Sakama et al. | |
| 7,764,928 B2 * | 7/2010 | Dokai et al. | 455/41.2 |
| 2002/0011967 A1 | 1/2002 | Goff et al. | |
| 2002/0044092 A1 | 4/2002 | Kushihi | |
| 2002/0067316 A1 | 6/2002 | Yokoshima et al. | |
| 2004/0001027 A1 | 1/2004 | Killen et al. | |
| 2004/0217915 A1 | 11/2004 | Imaizumi | |
| 2004/0219956 A1 | 11/2004 | Iwai et al. | |
| 2004/0227673 A1 | 11/2004 | Iwai et al. | |
| 2005/0092836 A1 | 5/2005 | Kudo | |
| 2005/0099337 A1 | 5/2005 | Takei et al. | |
| 2005/0125093 A1 | 6/2005 | Kikuchi et al. | |
| 2005/0140512 A1 | 6/2005 | Sakama et al. | |
| 2005/0190107 A1 * | 9/2005 | Takagi et al. | 343/702 |
| 2005/0232412 A1 | 10/2005 | Ichihara et al. | |
| 2005/0236623 A1 | 10/2005 | Takechi et al. | |
| 2005/0275539 A1 | 12/2005 | Sakama et al. | |
| 2006/0001138 A1 | 1/2006 | Sakama et al. | |
| 2006/0055601 A1 | 3/2006 | Kameda et al. | |
| 2006/0071084 A1 | 4/2006 | Detig et al. | |
| 2006/0109185 A1 | 5/2006 | Iwai et al. | |
| 2006/0158380 A1 | 7/2006 | Son et al. | |
| 2006/0267138 A1 | 11/2006 | Kobayashi | |
| 2006/0276132 A1 * | 12/2006 | Sheng-Fuh et al. | 455/41.2 |
| 2007/0004028 A1 | 1/2007 | Lair et al. | |
| 2007/0018893 A1 | 1/2007 | Kai et al. | |
| 2007/0040028 A1 | 2/2007 | Kawamata | |
| 2007/0052613 A1 | 3/2007 | Gallschuetz et al. | |
| 2007/0252700 A1 | 11/2007 | Ishihara et al. | |
| 2007/0268191 A1 * | 11/2007 | Ishizuka et al. | 343/702 |
| 2007/0285335 A1 | 12/2007 | Bungo et al. | |
| 2008/0024156 A1 | 1/2008 | Arai et al. | |
| 2008/0169905 A1 | 7/2008 | Slatter | |
| 2008/0272885 A1 | 11/2008 | Atherton | |
| 2009/0002130 A1 | 1/2009 | Kato | |

FOREIGN PATENT DOCUMENTS

| | | | |
|---|---|---|---|
| JP | 50-143451 A | 11/1975 | |
| JP | 62-127140 U | 8/1987 | |
| JP | 05-327331 A | 12/1993 | |
| JP | 6-53733 A | 2/1994 | |
| JP | 06-077729 A | 3/1994 | |
| JP | 06-177635 A | 6/1994 | |
| JP | 07-183836 A | 7/1995 | |
| JP | 08-056113 A | 2/1996 | |
| JP | 8-87580 | 4/1996 | |
| JP | 11-149537 A | 6/1996 | |
| JP | 08-279027 A | 10/1996 | |
| JP | 08-307126 A | 11/1996 | |
| JP | 08-330372 A | 12/1996 | |
| JP | 09-014150 A | 1/1997 | |
| JP | 09-245381 A | 9/1997 | |
| JP | 09-252217 A | 9/1997 | |
| JP | 09-270623 A | 10/1997 | |
| JP | 10-505466 A | 5/1998 | |
| JP | 10-171954 A | 6/1998 | |
| JP | 10-293828 A | 11/1998 | |
| JP | 11-149538 A | 6/1999 | |
| JP | 11-219420 A | 8/1999 | |
| JP | 11-328352 A | 11/1999 | |
| JP | 11-346114 A | 12/1999 | |
| JP | 11-515094 A | 12/1999 | |
| JP | 2000-21128 A | 1/2000 | |
| JP | 2000-021639 A | 1/2000 | |
| JP | 2000-022421 A | 1/2000 | |
| JP | 2005-229474 A | 1/2000 | |
| JP | 2000-059260 A | 2/2000 | |
| JP | 2000-085283 A | 3/2000 | |
| JP | 2000-132643 A | 5/2000 | |
| JP | 2000-137778 A | 5/2000 | |
| JP | 2000-148948 A | 5/2000 | |
| JP | 2000-172812 A | 6/2000 | |
| JP | 2000-510271 A | 8/2000 | |
| JP | 2000-276569 A | 10/2000 | |
| JP | 2000-286634 A | 10/2000 | |
| JP | 2000-286760 A | 10/2000 | |
| JP | 2000-311226 A | 11/2000 | |
| JP | 2000-321984 A | 11/2000 | |
| JP | 2001-028036 A | 1/2001 | |
| JP | 2007-18067 A | 1/2001 | |
| JP | 2001-66990 A | 3/2001 | |
| JP | 2001-168628 A | 6/2001 | |
| JP | 2001-256457 A | 9/2001 | |
| JP | 2001-514777 A | 9/2001 | |
| JP | 2001-319380 A | 11/2001 | |
| JP | 2001-331976 A | 11/2001 | |
| JP | 2001-332923 A | 11/2001 | |
| JP | 2001-344574 A | 12/2001 | |
| JP | 2001-351084 A | 12/2001 | |
| JP | 2002-024776 A | 1/2002 | |
| JP | 2002-042076 A | 2/2002 | |
| JP | 2002-505645 A | 2/2002 | |
| JP | 2002-76750 A | 3/2002 | |
| JP | 2002-150245 A | 5/2002 | |
| JP | 2002-175508 A | 6/2002 | |
| JP | 2002-183690 A | 6/2002 | |
| JP | 2002-185358 A | 6/2002 | |
| JP | 2002-204117 A | 7/2002 | |
| JP | 2002-230128 A | 8/2002 | |
| JP | 2002-298109 A | 10/2002 | |
| JP | 2002-319008 A | 10/2002 | |
| JP | 2002-362613 A | 12/2002 | |
| JP | 2002-373029 A | 12/2002 | |
| JP | 2002-373323 A | 12/2002 | |
| JP | 2003-016412 A | 1/2003 | |
| JP | 2003-030612 A | 1/2003 | |
| JP | 2003-44789 A | 2/2003 | |
| JP | 2003-58840 A | 2/2003 | |
| JP | 2003-067711 A | 3/2003 | |
| JP | 2003-076947 A | 3/2003 | |
| JP | 2003-085501 A | 3/2003 | |
| JP | 2003-085520 A | 3/2003 | |
| JP | 2003-87008 A | 3/2003 | |
| JP | 2003-87044 A | 3/2003 | |
| JP | 2003-099720 A | 4/2003 | |
| JP | 2003-099721 A | 4/2003 | |
| JP | 2003-110344 A | 4/2003 | |
| JP | 2003-132330 A | 5/2003 | |
| JP | 2003-134007 A | 5/2003 | |
| JP | 2003-155062 A | 5/2003 | |
| JP | 2003-158414 A | 5/2003 | |
| JP | 2003-187207 A | 7/2003 | |

| | | | |
|---|---|---|---|
| JP | 2003-187211 A | 7/2003 |
| JP | 2003-198230 A | 7/2003 |
| JP | 2003-209421 A | 7/2003 |
| JP | 2003-218624 A | 7/2003 |
| JP | 2003-233780 A | 8/2003 |
| JP | 2003-242471 A | 8/2003 |
| JP | 2003-243918 A | 8/2003 |
| JP | 2003-288560 A | 10/2003 |
| JP | 2003-309418 A | 10/2003 |
| JP | 2003-332820 A | 11/2003 |
| JP | 2004-88218 A | 3/2004 |
| JP | 2004-096566 A | 3/2004 |
| JP | 2004-253858 A | 9/2004 |
| JP | 2004-287767 A | 10/2004 |
| JP | 2004-297249 A | 10/2004 |
| JP | 2004-326380 A | 11/2004 |
| JP | 2004-334268 A | 11/2004 |
| JP | 2004-336250 A | 11/2004 |
| JP | 2004-343000 A | 12/2004 |
| JP | 2004-362190 A | 12/2004 |
| JP | 2004-362341 A | 12/2004 |
| JP | 2004-362602 A | 12/2004 |
| JP | 2005-136528 A | 5/2005 |
| JP | 2005-165839 A | 6/2005 |
| JP | 2005-167327 A | 6/2005 |
| JP | 2005-191705 A | 7/2005 |
| JP | 2005-210676 A | 8/2005 |
| JP | 2005-210680 A | 8/2005 |
| JP | 2005-217822 A | 8/2005 |
| JP | 2005-236339 A | 9/2005 |
| JP | 2005-244778 A | 9/2005 |
| JP | 2005-275870 A | 10/2005 |
| JP | 2005-295135 A | 10/2005 |
| JP | 2005-311205 A | 11/2005 |
| JP | 2005-321305 A | 11/2005 |
| JP | 2005-335755 A | 12/2005 |
| JP | 2005-346820 A | 12/2005 |
| JP | 2005-352858 A | 12/2005 |
| JP | 2006-031766 A | 2/2006 |
| JP | 2006-39902 A | 2/2006 |
| JP | 2006-67479 A | 3/2006 |
| JP | 2006-72706 A | 3/2006 |
| JP | 2006-80367 A | 3/2006 |
| JP | 2006-92630 A | 4/2006 |
| JP | 2006-102953 A | 4/2006 |
| JP | 2006-148518 A | 6/2006 |
| JP | 2006-195795 A | 7/2006 |
| JP | 2006-270212 A | 10/2006 |
| JP | 2006-309401 A | 11/2006 |
| JP | 2007-65822 A | 3/2007 |
| JP | 2007-150868 A | 6/2007 |
| JP | 11-175678 A | 1/2009 |
| NL | 9100176 A | 3/1992 |
| NL | 9100347 A | 3/1992 |
| WO | 03/079305 A1 | 9/2003 |
| WO | 2004/036772 A1 | 4/2004 |
| WO | 2004/070879 A | 8/2004 |
| WO | 2004/072892 A1 | 8/2004 |
| WO | 2005/073937 A | 8/2005 |
| WO | 2005/115849 A1 | 12/2005 |
| WO | 2006/045682 A | 5/2006 |

OTHER PUBLICATIONS

English translation of NL9100176, published on Mar. 2, 1992.
English translation of NL9100347, published on Mar. 2, 1992.
Kato et al.: "Antenna," U.S. Appl. No. 11/928,502, filed Oct. 30, 2007.
Kato et al.: Wireless IC Device, U.S. Appl. No. 12/211,117, filed Sep. 16, 2008.
Kato et al.: "Antenna," U.S. Appl. No. 11/688,290, filed Mar. 20, 2007.
Kato et al.: "Electromagnetic-Coupling-Module-Attached Article," U.S. Appl. No. 11/740,509, filed Apr. 26, 2007.
Kato et al.: "Product Including Power Supply Circuit Board," U.S. Appl. No. 12/234,949, filed Sep. 22, 2008.
Kato et al.: "Data Coupler," U.S. Appl. No. 12/252,475, filed Oct. 16, 2008.
Kato et al.; "Information Terminal Device," U.S. Appl. No. 12/267,666, filed Nov. 10, 2008.
Kato et al.: "Wireless IC Device and Wireless IC Device Composite Component," U.S. Appl. No. 12/276,444, filed Nov. 24, 2008.
Dokai et al.: "Optical Disc," U.S. Appl. No. 12/326,916, filed Dec. 3, 2008.
Dokai et al.: "System for Inspecting Electromagnetic Coupling Modules and Radio IC Devices and Method for Manufacturing Electromagnetic Coupling Modules and Radio IC Devices Using the System," U.S. Appl. No. 12/274,400, filed Nov. 20, 2008.
Kato: "Wireless IC Device," U.S. Appl. No. 11/964,185, filed Dec. 26, 2007.
Kato et al.: "Radio Frequency IC Device," U.S. Appl. No. 12/336,629, filed Dec. 17, 2008.
Kato et al.: "Wireless IC Device and Component for Wireless IC Device," U.S. Appl. No. 12/339,198, filed Dec. 19, 2008.
Ikemoto et al.: "Wireless IC Device," U.S. Appl. No. 11/851,651, filed Sep. 7, 2007.
Kataya et al.: "Wireless IC Device and Electronic Device," U.S. Appl. No. 11/851,661, filed Sep. 7, 2007.
Dokai et al.: "Wireless IC Device and Component for Wireless IC Device," U.S. Appl. No. 12/359,690, filed Jan. 26, 2009.
Official communication issued in Japanese Application No. 2007-531524, mailed on Sep. 11, 2007.
Official communication issued in Japanese Application No. 2007-531525, mailed on Sep. 25, 2007.
Official communication issued in Japanese Application No. 2007-531524, mailed on Dec. 12, 2007.
Official communication issued in European Application No. 07706650.4, mailed on Nov. 24, 2008.
Mukku-Sha, "Musen IC Tagu Katsuyo-no Subete" "(All About Wireless IC Tags"), RFID, pp. 112-126.
Dokai et al.: "Wireless IC Device and Component for Wireless IC Device," U.S. Appl. No. 11/624,382, filed Jan. 18, 2007.
Dokai et al.: "Wireless IC Device, and Component for Wireless IC Device," U.S. Appl. No. 11/930,818, filed Oct. 31, 2007.
Kato et al.: "Wireless IC Device," U.S. Appl. No. 12/042,399, filed Mar. 5, 2008.
Official communication issued in related U.S. Appl. No. 12/042,399, mailed Aug. 25, 2008.

* cited by examiner

ANTENNA AND RADIO IC DEVICE

BACKGROUND OF THE INVENTION

1. Field of the Invention

The present invention relates to an antenna and a radio IC (Integrated Circuit) device, and particularly to an antenna capable of transmitting/receiving electromagnetic waves with a high gain and a radio IC device including a radio IC chip used for an RFID (Radio Frequency Identification) system.

2. Description of the Related Art

Generally, it is known that electromagnetic waves travel with an electric field component and a magnetic field component being substantially perpendicular to each other and that the energies of both components are substantially equivalent to each other. A conventional dipole antenna has been used for transmitting/receiving only an electric field component of electromagnetic waves, whereas a conventional loop antenna has been used for transmitting/receiving only a magnetic field component of electromagnetic waves. That is, conventional antennas have been used for transmitting/receiving energy of one of an electric field component and a magnetic field component, and further improvement in terms of gain is not expected.

Recently, an RFID system has been developed as a system to manage articles. In the RFID system, a reader/writer that generates an induction field communicates with an IC chip (also called an IC tag or a radio IC chip) that is attached to an article or a container, for example, and that stores predetermined information in a noncontact manner so as to transmit the information. The device described in Japanese Unexamined Patent Application Publication No. 2000-311226 is a known radio IC device on which an IC chip is mounted.

In this radio IC device, a first antenna coil disposed on a rear surface of an IC chip and a second antenna coil disposed on a module substrate face each other and magnetically couple to each other, so that signals are transmitted/received between the IC chip and the second antenna coil. On the module substrate, a third antenna coil is also disposed on an outer side of the second antenna coil, and signals are transmitted/received by the third antenna coil to/from a reader/writer.

However, in order to achieve coupling between the first antenna coil disposed on the rear surface of the IC chip and the second antenna coil disposed on the module substrate, the distance between the first and second antenna coils must be controlled to be about 20 μm or less, and the IC chip must be precisely mounted on the module substrate such that the first and second antenna coils precisely overlap each other in a plan view. A desired characteristic may not be obtained using ordinary facilities. In order to precisely mount IC chips at small intervals, high-performance apparatuses to manufacture thin films for antenna coils and to mount IC chips are required, which significantly increases the manufacturing costs.

Furthermore, an operating frequency of the third antenna coil to transmit/receive signals to/from the reader/writer depends on the length of the third antenna coil, and thus, the size of device increases when a low frequency is used.

SUMMARY OF THE INVENTION

To overcome the problems described above, preferred embodiments of the present invention provide an antenna that is capable of efficiently transmitting/receiving electromagnetic waves and obtaining an increased gain as compared to a conventional antenna.

Furthermore, preferred embodiments of the present invention provide a radio IC device that is capable of easily being assembled and that obtains desired radiation characteristic and directivity and that is preferable for use in the RFID system.

According to a first preferred embodiment of the present invention, an antenna includes a feeder terminal and a resonance circuit, the resonance circuit including at least a capacitance element and an inductance element. The antenna includes a first radiation element that is arranged to be electromagnetically coupled to the capacitance element, and a second radiation element that is arranged to be electromagnetically coupled to the inductance element.

In the antenna according to the first preferred embodiment, the first radiation element that is arranged to electromagnetically couple to the capacitance element and the second radiation element that is arranged to electromagnetically couple to the inductance element are provided, and thus electromagnetic waves can be efficiently transmitted/received and the gain of the antenna can be increased.

The reasons for this include: (1) electric field energy and magnetic field energy of electromagnetic waves can be simultaneously transmitted/received by a single antenna, and transmission efficiency of electromagnetic waves increases, and (2) power is fed to the first radiation element from the capacitance element by electromagnetic field coupling whereas power is fed to the second radiation element from the inductance element by electromagnetic field coupling, wherein the two radiation elements completely match the impedance (for example, about 377Ω) in free space and transmission efficiency of electromagnetic waves is increased.

In the antenna according to the first preferred embodiment, an antenna substrate including the resonance circuit is preferably provided. The feeder terminal may preferably be disposed on a first principal surface of the antenna substrate and the first and second radiation elements may preferably be disposed on a second principal surface of the antenna substrate. In addition, when the capacitance element and the inductance element are included in the antenna substrate and arranged substantially parallel to each other, electromagnetic field coupling with the first and second radiation elements can be efficiently performed.

The first radiation element and the second radiation element may preferably be disposed in directions that are perpendicular or substantially perpendicular to each other or parallel or substantially parallel to each other. In addition, the first radiation element may be connected to the second radiation element via a capacitance element. Alternatively, the first radiation element or the second radiation element may be circular or substantially circular and may have an end directly connected to the second radiation element or the first radiation element.

According to a second preferred embodiment of the present invention, a radio IC device includes a radio IC chip arranged to process transmission and reception signals, a feeder circuit substrate including an inductance element electrode and a capacitance element electrode defining a resonance circuit, the electrodes being disposed at different locations in a plan perspective view, a first radiation plate facing the inductance element electrode, and a second radiation plate facing the capacitance element electrode. The radio IC chip is mounted on the feeder circuit substrate, thereby defining an electromagnetic coupling module. The radio IC chip is operated by signals received by the first and second radiation plates and a response signal from the radio IC chip is radiated from the first and second radiation plates to the outside.

In the radio IC device according to the second preferred embodiment, the first radiation plate magnetically couples to the inductance element and the second radiation plate electrically couples to the capacitance element so as to function as an antenna. Thus, desired radiation characteristic and directivity can be obtained in accordance with the shape and location of the first and/or the second radiation plate. Particularly, electric field coupling by capacitance enables greater efficiency in transmitting signal energy than in magnetic field coupling, and thus, the radiation characteristic can be improved. Furthermore, coupling states with the first and second radiation plates can be individually set in the inductance element and the capacitance element, so that the degree of freedom in designing the radiation characteristic is increased.

Since the resonance frequency of high-frequency signals is determined by the resonance circuit provided in the feeder circuit substrate, the shape and size of the radiation plates are not strictly limited and can be arbitrarily set, such that a compact radio IC device can be obtained. Furthermore, the feeder circuit substrate and the first and second radiation plates electromagnetically couple to each other without being electrically and directly connected to each other. Thus, the electromagnetic coupling module operates when being disposed in close proximity to the radiation plates, instead of being provided on the radiation plates. The electromagnetic coupling module need not be disposed on the radiation plates with high precision, and an attaching process is significantly simplified.

In the radio IC device according to the second preferred embodiment, the area of the second radiation plate may be greater than that of the first radiation plate. Since the second radiation plate is arranged to be electrically coupled to the capacitance element by capacitance, the radiation characteristic thereof does not depend on a change in phase in the second radiation plate. The shape of the second radiation plate can be freely set, and the radiation characteristic is improved by increasing the area thereof.

Preferably, the first radiation plate has a line length of an integral multiple of a half wavelength of a resonance frequency. The first radiation plate, which is coupled to the inductance element, can obtain a favorable radiation characteristic when having a length of a half wavelength of a frequency of high-frequency signals propagating in the first radiation plate. Thus, the radiation characteristic is improved by setting the line length of the first radiation plate equal to an integral multiple of a half wavelength.

The first and second radiation plates may be arranged such that longitudinal sides of the radiation plates are in substantially the same orientation. The same directivity can be provided to transmission and reception signals. In addition, at least one of the first and second radiation plates may preferably branch at an approximate middle portion in a longitudinal direction. Alternatively, at least one of the first and second radiation plates may preferably branch at a predetermined angle at a root portion. By branching the radiation plates, the directivity of transmission and reception signals can be improved and the radiation characteristic when the radio IC device is attached to a corner portion of a three-dimensional object can be improved.

The feeder circuit substrate may preferably include a multilayer substrate made of ceramic or resin, for example. Alternatively, the feeder circuit substrate may preferably include a flexible substrate, such as a PET film, for example. When the feeder circuit substrate includes a multilayer substrate or a flexible substrate, the inductance element and the capacitance element can be arranged with high precision, and the degree of freedom when forming wiring electrodes is increased. Particularly, by using the flexible substrate, the radio IC device can have a lower profile and can be attached to a radiation plate having a curved surface.

The radio IC chip may store various pieces of information about an article to which the radio IC device is attached. Alternatively, the information may be rewritten, and the radio IC chip may have an information processing function other than the function of the RFID system.

According to the first preferred embodiment of the present invention, an electric field component and a magnetic field component of electromagnetic waves can be efficiently transmitted/received, and an antenna having an increased gain can be obtained.

According to the second preferred embodiment, the first and second radiation plates defining an antenna are arranged to be electromagnetically coupled to the feeder circuit substrate. Thus, a desired radiation characteristic and directivity can be obtained in accordance with the shape and location of the first and/or the second radiation plate, a coupling state with the first and second radiation plates can be individually set in the inductance element and the capacitance element, and the degree of freedom in designing the radiation characteristic is increased. The shape and size of the first and second radiation plates can be arbitrarily set, such that a compact radio IC device can be obtained. Furthermore, the electromagnetic coupling module operates when being disposed in close proximity to the first and second radiation plates instead of being provided on the first and second radiation plates. The electromagnetic coupling module need not be disposed on the first and second radiation plates with high precision, and an attaching process is significantly simplified.

Other features, elements, steps, characteristics and advantages of the present invention will become more apparent from the following detailed description of preferred embodiments of the present invention with reference to the attached drawings.

DETAILED DESCRIPTION OF PREFERRED EMBODIMENTS

Figure 1:
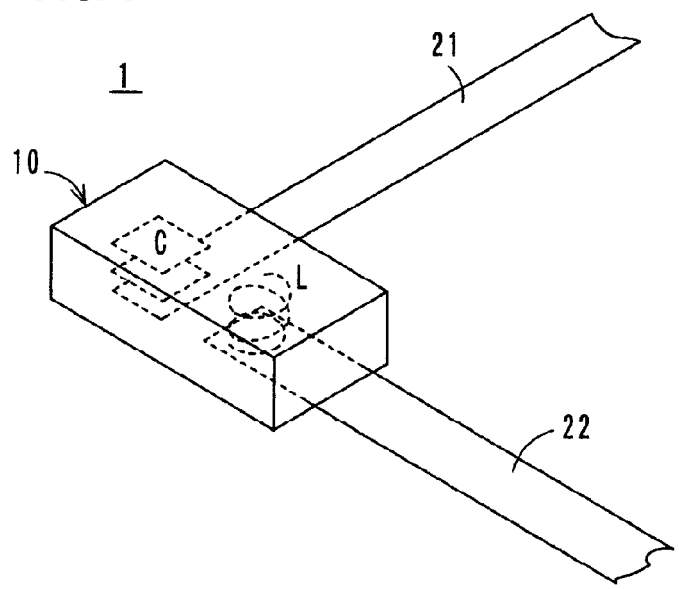
FIG. 1 is a perspective view schematically illustrating a configuration of an antenna according to a preferred embodiment of the present invention.

Hereinafter, preferred embodiments of an antenna and a radio IC device according to the present invention are described with reference to the drawings. In respective figures illustrating the respective preferred embodiments of the antenna and the radio IC device, common components and parts are denoted by the same reference numerals and redundant explanations are omitted.

Schematic Configuration of Antenna According to Preferred Embodiments of the Present Invention FIG. 1 schematically illustrates an antenna 1 according to preferred embodiments of the present invention. In the antenna 1, an antenna substrate 10 preferably includes a capacitance element C and an inductance element L defining an LC resonance circuit, the capacitance element C is arranged to be electromagnetically coupled to a first radiation plate 21, and the inductance element L is arranged to be electromagnetically coupled to a second radiation plate 22.

First Preferred Embodiment of Antenna

Figure 2:
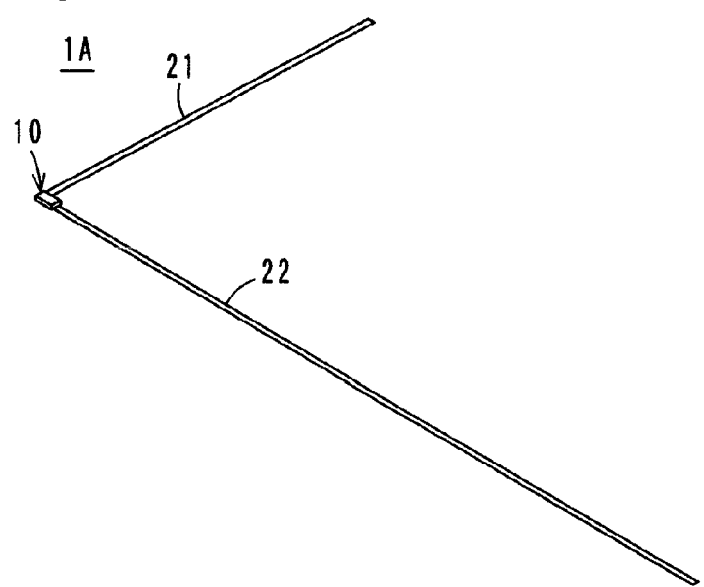
FIG. 2 is a perspective view illustrating the antenna according to a first preferred embodiment of the present invention.

As illustrated in an external perspective view in FIG. 2, an antenna 1A according to a first preferred embodiment of the present invention includes the antenna substrate 10 including the resonance circuit, and first and second radiation plates 21 and 22 attached to the antenna substrate 10 in directions substantially perpendicular to each other. The antenna 1A can be used as a compact antenna that can be mounted on a surface of a substrate of a mobile phone or other device. Alternatively, the antenna 1A can be used as a radio IC device by mounting a radio IC chip 50 (see FIG. 4) used for a RFID (Radio Frequency Identification) system thereon. This is also true in the second to sixth preferred embodiments described below.

Figure 3:
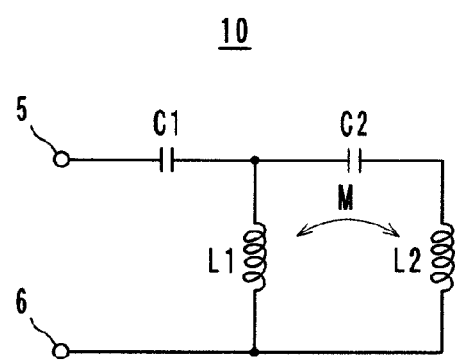
FIG. 3 is an equivalent circuit diagram of a resonance circuit included in an antenna substrate of the first preferred embodiment of the present invention.

As illustrated in an equivalent circuit diagram in FIG. 3, the antenna substrate 10 includes inductance elements L1 and L2 that are magnetically coupled to each other (see reference symbol M) and capacitance elements C1 and C2. One end of the inductance element L1 is connected to a feeder terminal 5 via the capacitance element C1 and is also connected to one end of the inductance element L2 via the capacitance element C2. In addition, the other ends of the inductance elements L1 and L2 are connected to a feeder terminal 6. That is, this resonance circuit includes an LC series resonance circuit including the inductance element L1 and the capacitance element C1 and an LC series resonance circuit including the inductance element L2 and the capacitance element C2.

Figure 4:
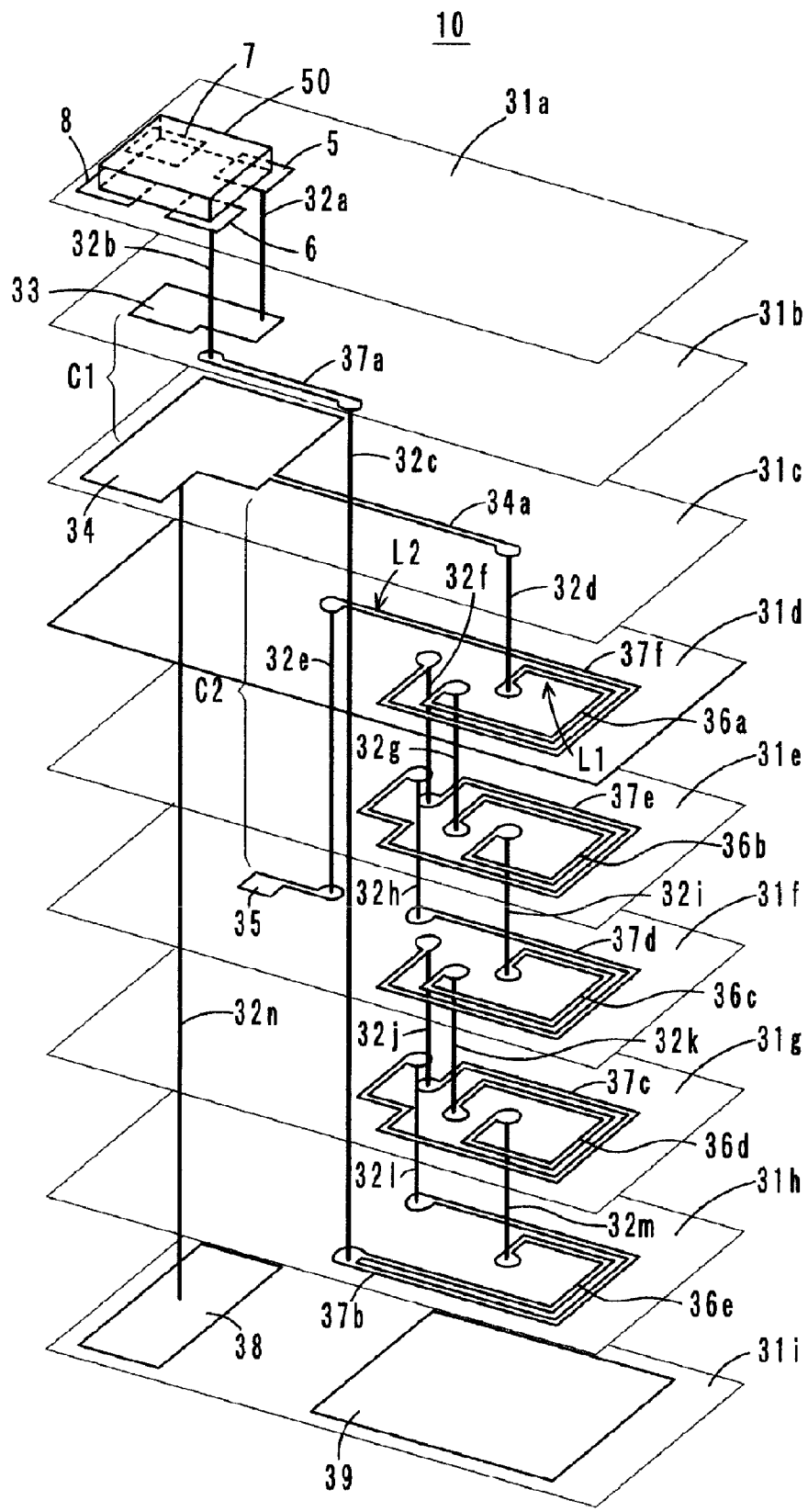
FIG. 4 is an exploded perspective view illustrating the antenna substrate shown in FIG. 2.

The antenna substrate 10 having the circuit configuration illustrated in FIG. 3 preferably has a laminated structure as illustrated in FIG. 4. This laminated structure is preferably formed by laminating, crimping, and firing ceramic sheets 31a to 31i made of a dielectric material. Specifically, the sheet 31a is provided with the feeder terminals 5 and 6, ground terminals 7 and 8, and via-hole conductors 32a and 32b. The sheet 31b is provided with a capacitor electrode 33, a conductor pattern 37a, and a via-hole conductor 32c. The sheet 31c is provided with a capacitor electrode 34, a conductor pattern 34a extending from the capacitor electrode 34, and a via-hole conductor 32d.

Furthermore, the sheet 31d is provided with conductor patterns 36a and 37f and via-hole conductors 32e, 32f, and 32g. The sheet 31e is provided with conductor patterns 36b and 37e and via-hole conductors 32h and 32i. The sheet 31f is provided with a capacitor electrode 35, conductor patterns 36c and 37d, and via-hole conductors 32j and 32k. The sheet 31g is provided with conductor patterns 36d and 37c and via-hole conductors 32l and 32m. The sheet 31h is provided with conductor patterns 36e and 37b. The sheet 31i is provided with electrode patterns 38 and 39.

By laminating the above-described sheets 31a to 31i, the conductor patterns 36a to 36e are connected via the via-hole conductors 32g, 32i, 32k, and 32m, whereby the inductance element L1 is formed. In addition, the conductor patterns 37b to 37f are connected via the via-hole conductors 32l, 32j, 32h, and 32f, whereby the inductance element L2 is formed. The capacitance element C1 is defined by the electrodes 33 and 34, and the capacitance element C2 is defined by the electrodes 34 and 35.

One end of the inductance element L1 is connected to the capacitor electrode 34 via the via-hole conductor 32d and the conductor pattern 34a. One end of the inductance element L2 is connected to the capacitor electrode 35 via the via-hole conductor 32e. The other ends of the inductance elements L1 and L2 are connected to the feeder terminal 6 via the via-hole conductor 32c, the conductor pattern 37a, and the via-hole conductor 32b. The capacitor electrode 33 is connected to the feeder terminal 5 via the via-hole conductor 32a.

In the antenna 1A having the above-described configuration, the first radiation plate 21 is connected to the electrode pattern 38 disposed on a bottom surface of the antenna substrate 10, and the second radiation plate 22 is connected to the electrode pattern 39. The electrode pattern 38 is connected to the capacitor electrode 34 via a via-hole conductor 32n extending through the respective sheets 31c to 31h.

The first and second radiation plates 21 and 22 are preferably made of a nonmagnetic material, such as aluminum foil or copper foil, for example, and are preferably supported by an insulating flexible resin film (not illustrated), such as PET (polyethylene terephthalate), for example.

In the antenna 1A, the LC series resonance circuits including the inductance elements L1 and L2 are magnetically coupled to each other, the capacitance elements C1 and C2 are electromagnetically coupled to the first radiation plate 21, and the inductance elements L1 and L2 are electromagnetically coupled to the second radiation plate 22.

An average gain of the antenna 1A is about +2.5 dBi, for example, and a maximum gain thereof is about +5 dBi, for example. These values are significantly better than those of a conventional antenna, in which an average gain is about −0.7 dBi and a maximum gain is about +1.7 dBi.

The inductance elements L1 and L2 are coupled to each other via the capacitance elements C1 and C2, thereby functioning as a matching circuit for the impedance of a device (e.g., radio IC chip 50) connected to the feeder terminals 5 and 6 (typically about 50Ω) and the spatial impedance (typically about 377Ω).

A coupling coefficient k of the inductance elements L1 and L2 adjacent to each other is represented by $k^2=M^2/(L1 \times L2)$, and is preferably at least about 0.1, for example, and is about 0.76 in the first preferred embodiment, for example. Since the LC resonance circuit is defined by a lumped-constant resonance circuit including the inductance elements L1 and L2 and the capacitance elements C1 and C2, the resonance circuit can be easily designed in a low frequency band of about 5 GHz or less and is less much dependently upon the radiation plates 21 and 22.

If the resonance circuit is defined by a distributed-constant resonance circuit, an inductance element is preferably defined by a strip line or other suitable structure, and thus, the resonance circuit can be easily designed in a high frequency band of at least about 5 GHz, for example.

Second Preferred Embodiment of Antenna

Figure 5:
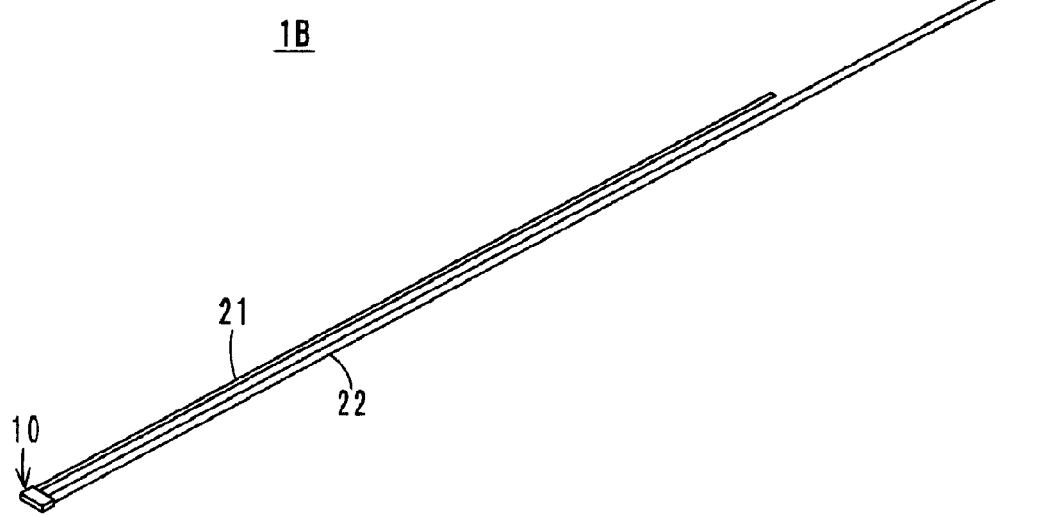
FIG. 5 is a perspective view illustrating the antenna according to a second preferred embodiment of the present invention.

As illustrated in an external perspective view in FIG. 5, an antenna 1B according to the second preferred embodiment of the present invention includes the antenna substrate 10 described above in the first preferred embodiment and the first and second radiation plates 21 and 22 attached to the antenna substrate 10 are arranged parallel or substantially parallel to each other. The configuration of the antenna substrate 10 preferably is substantially the same as that illustrated in FIG. 4.

In the antenna 1B, as in the antenna 1A according to the first preferred embodiment, the capacitance elements C1 and C2 are electromagnetically coupled to the first radiation plate 21, and the inductance elements L1 and L2 are electromagnetically coupled to the second radiation plate 22, such that the gain is improved. Furthermore, stray capacitance that occurs between the radiation plates 21 and 22 arranged substantially in parallel define a series resonance circuit (the radiation plates 21 and 22 are electrostatically coupled to each other), and electric-field energy generated by a magnetic field propagates from the second radiation plate 22 to the first radiation plate 21 via capacitance and is emitted as electric-field energy. This synergistic effect further improves the gain.

The first radiation plate 21 preferably has a width of about 0.725 mm and a length of about 120 mm, for example. The second radiation plate 22 preferably has a width of about 1.425 mm and a length of about 160 mm, for example. The gap between the plates is preferably about 1.4 mm, for example. In this case, an average gain of the antenna 1B is about +9.8 dBi and a maximum gain thereof is about +12.7 dBi, for example.

Third Preferred Embodiment of Antenna

Figure 6:
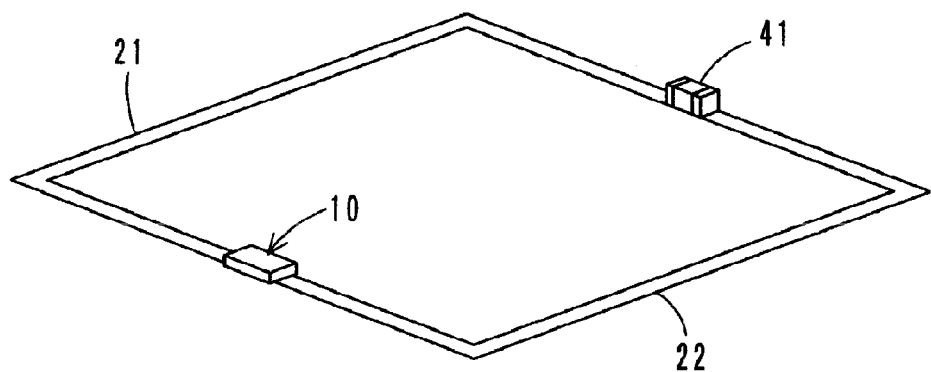
FIG. 6 is a perspective view illustrating the antenna according to a third preferred embodiment of the present invention.

As illustrated in an external perspective view in FIG. 6, an antenna 1C according to the third preferred embodiment of the present invention includes the antenna substrate 10 described above in the first preferred embodiment and the first and second radiation plates 21 and 22 attached to the antenna substrate 10. The first and second radiation plates 21 and 22 preferably have a substantial rectangular shape and an end of each of the first and second radiation plates 21 and 22 are connected to a chip capacitor 41 arranged to capacitively couple the first and second radiation plates 21 and 22. Since the radiation plates 21 and 22 are capacitively coupled to each other, the gain is improved as in the antenna 1B according to the second preferred embodiment. In addition, miniaturization can be achieved as compared to the second preferred embodiment.

Fourth Preferred Embodiment of Antenna

Figure 7:
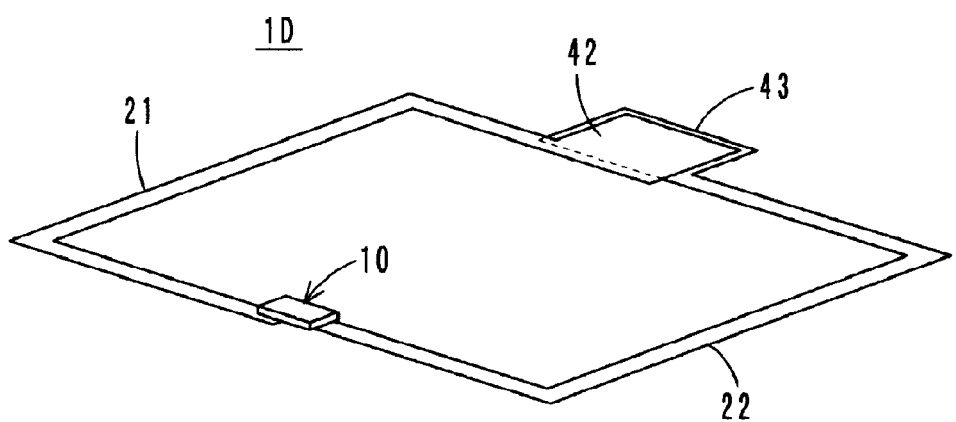
FIG. 7 is a perspective view illustrating the antenna according to a fourth preferred embodiment of the present invention.

As illustrated in an external perspective view in FIG. 7, an antenna 1D according to the fourth preferred embodiment includes the antenna substrate 10 described above in the first preferred embodiment and the first and second radiation plates 21 and 22 attached to the antenna substrate 10. The first and second radiation plates 21 and 22 preferably have a substantial rectangular shape, and wide capacitors 42 and 43 provided at ends thereof are arranged to be capacitively coupled to each other via a dielectric sheet (not illustrated). Since the radiation plates 21 and 22 are capacitively coupled to each other, the gain is improved as in the antennas 1B and 1C according to the second and third preferred embodiments. In addition, miniaturization can be achieved as compared to the second preferred embodiment.

Fifth Preferred Embodiment of Antenna

Figure 8:
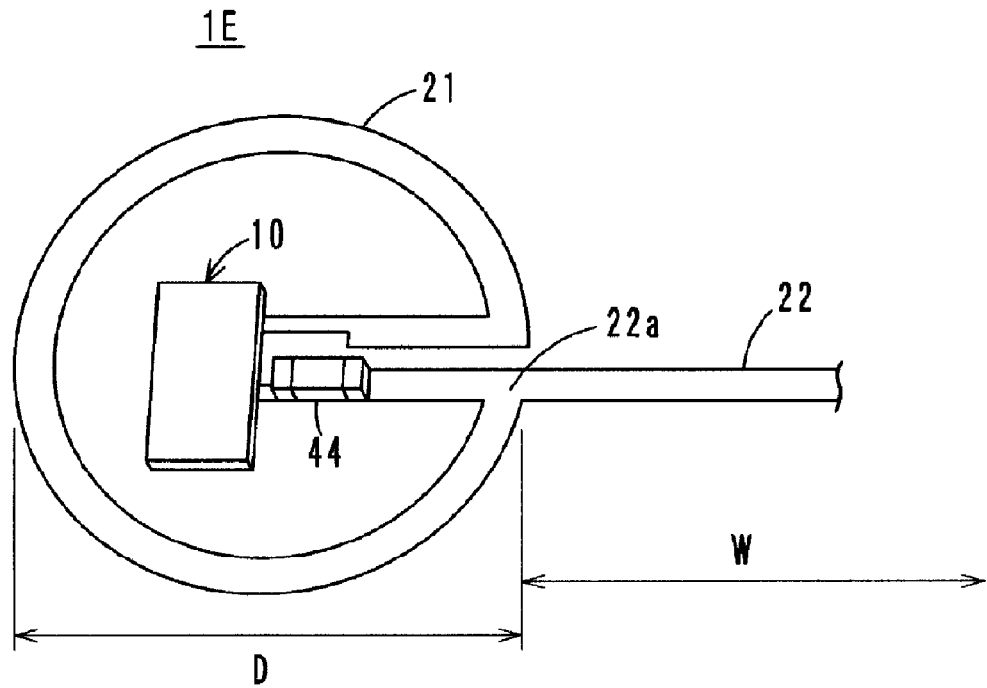
FIG. 8 is a perspective view illustrating the antenna according to a fifth preferred embodiment of the present invention.

As illustrated in an external perspective view in FIG. 8, an antenna 1E according to the fifth preferred embodiment includes the antenna substrate 10 described above in the first preferred embodiment, the first radiation plate 21 attached to the antenna substrate 10 and extending in a substantially circular shape, an end thereof being directly connected to the second radiation plate 22, and a chip capacitor 44 arranged between the second radiation plate 22 and the electrode pattern 39 (see FIG. 4). Since the radiation plates 21 and 22 are directly coupled to each other, the gain is improved as in the above-described antennas 1B, 1C, and 1D according to the second to fourth preferred embodiments. In addition, miniaturization can be achieved as compared to the second preferred embodiment. Furthermore, the intervening capacitor 44 enables an inductance component of the first radiation plate 21 and a capacitance of the capacitor 44 to adjust a resonance frequency.

When the first radiation plate 21 has a diameter D of about 9 mm and when a length W from a junction point 22a of the second radiation plate 22 is about 160 mm, an average gain of the antenna 1E is about +6.3 dBi and a maximum gain thereof is about +9.4 dBi, for example.

Sixth Preferred Embodiment of Antenna

Figure 9:
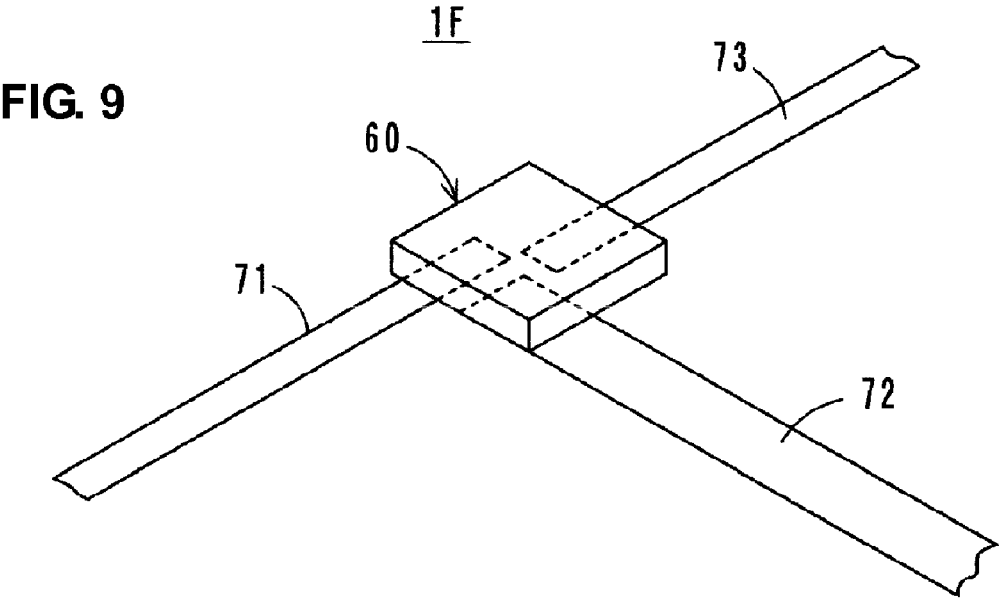
FIG. 9 is a perspective view illustrating the antenna according to a sixth preferred embodiment of the present invention.

As illustrated in an external perspective view in FIG. 9, an antenna 1F according to the sixth preferred embodiment includes an antenna substrate 60 including a resonance circuit, and first, second, and third radiation plates 71, 72, and 73 attached to the antenna substrate 60. The antenna substrate 60 includes the inductance elements L1 and L2 and the capacitance elements C1 and C2 illustrated in the equivalent circuit diagram in FIG. 3.

Figure 10:
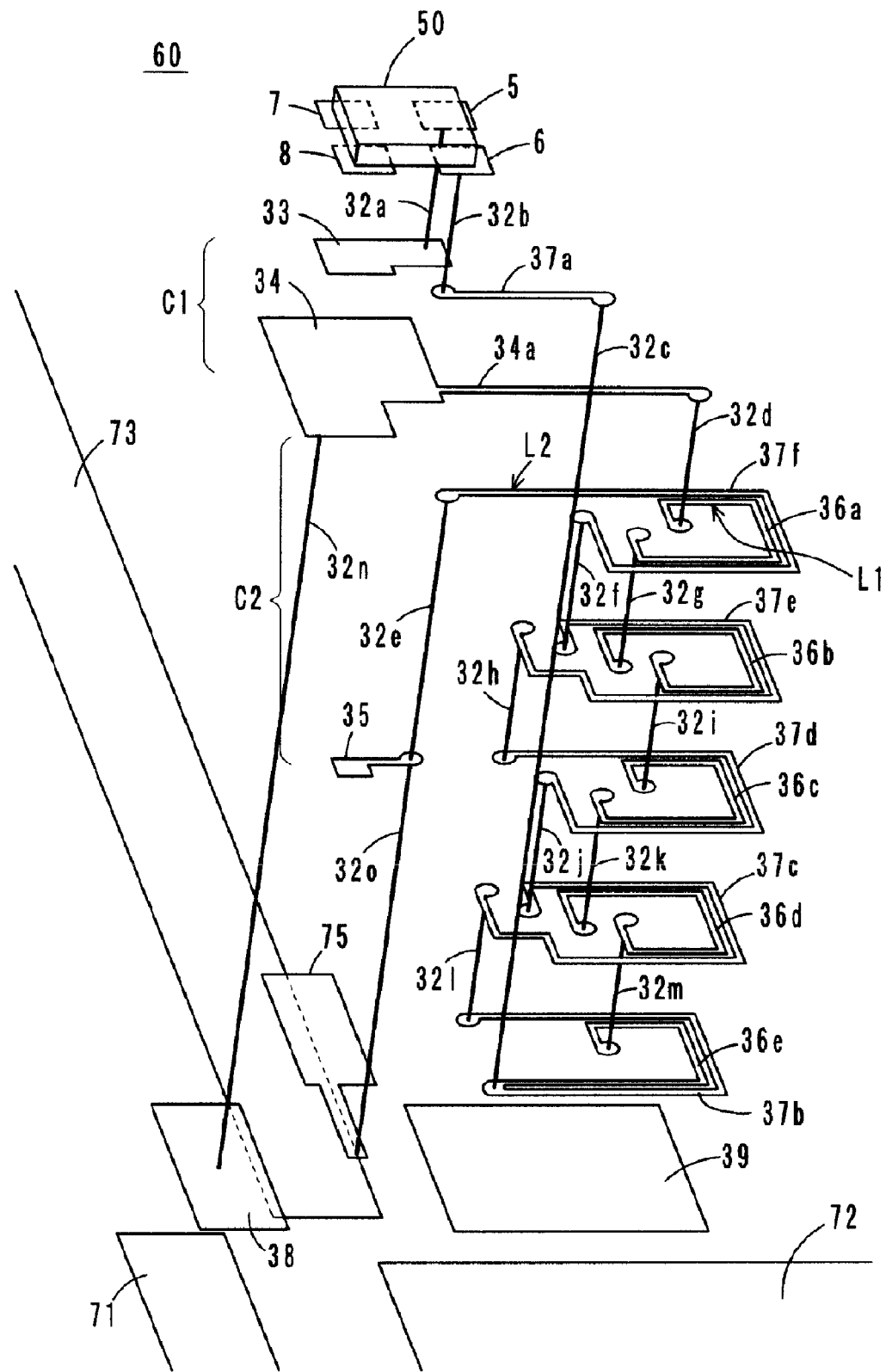
FIG. 10 is an exploded perspective view illustrating an antenna substrate of the sixth preferred embodiment of the present invention.

The antenna substrate 60 defining the antenna 1F preferably has a laminated structure as illustrated in FIG. 10. This laminated structure is substantially the same as the laminated structure illustrated in FIG. 4. The same components and elements are denoted by the same reference numerals and redundant explanations are omitted.

The difference between the laminated structure illustrated in FIG. 10 and the laminated structure illustrated in FIG. 4 is that the capacitor electrode 35 defining the capacitance element C2 connected to the inductance element L2 is connected to an electrode pattern 75 via a via-hole conductor 32o. The first radiation plate 71 is connected to the electrode pattern 38, the second radiation plate 72 is connected to the electrode pattern 39, and the third radiation plate 73 is connected to the electrode pattern 75.

In the antenna 1F, the portion between the capacitance elements C1 and C2 is electromagnetically coupled to the first radiation plate 71, the portion between the capacitance element C2 and the inductance element L2 is electromagnetically coupled to the third radiation plate 73, and the inductance elements L1 and L2 are electromagnetically coupled to the second radiation plate 72.

The operation of the antenna 1F is substantially the same as that of the antenna 1A according to the first preferred embodiment. The average gain and maximum gain thereof are substantially the same as those of the antenna 1A, with a significant improvement as compared to the conventional antenna.

First Preferred Embodiment of Radio IC Device

Figure 11:
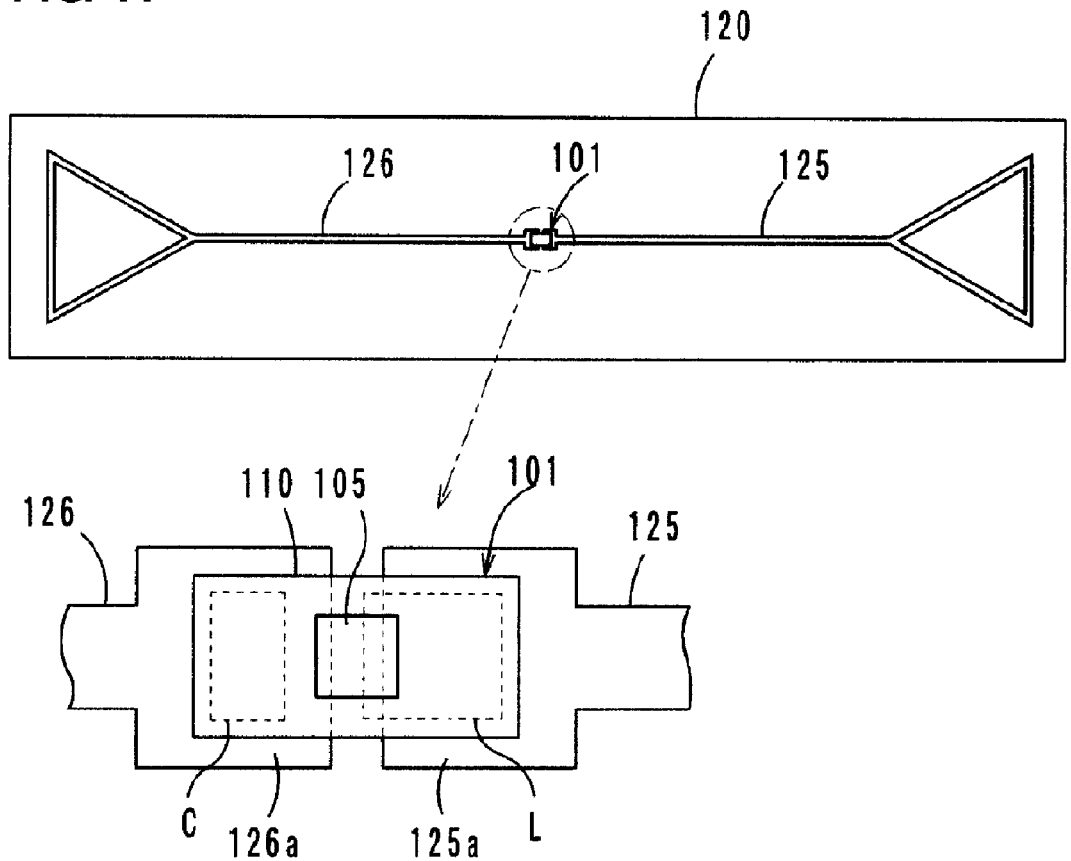
FIG. 11 is a plan view illustrating a radio IC device according to a first preferred embodiment of the present invention.

FIG. 11 illustrates a radio IC device according to a first preferred embodiment of the present invention. This radio IC device includes an electromagnetic coupling module 101 including a radio IC chip 105 to process transmission/reception signals of predetermined frequencies and a feeder circuit substrate 110 on which the radio IC chip 105 is mounted, and radiation plates 125 and 126 disposed on a PET film 120, for example.

Ends of the radiation plates 125 and 126 preferably include wide portions 125a and 126a, respectively, and the other ends thereof preferably include a substantially triangular loop shape. The radiation plates 125 and 126 are preferably formed by pasting a metal thin plate of a conductive material, such as aluminum foil or copper foil, for example, on the film 120 or by providing an electrode film of metal plating or conductive paste of Al, Cu, or Ag, for example, on the film 120. The wide portion 125a faces and is magnetically coupled to an inductance element L in the feeder circuit substrate 110 described below. The wide portion 126a faces and is electrically coupled to an electrode connected to a capacitance element C.

Figure 12:
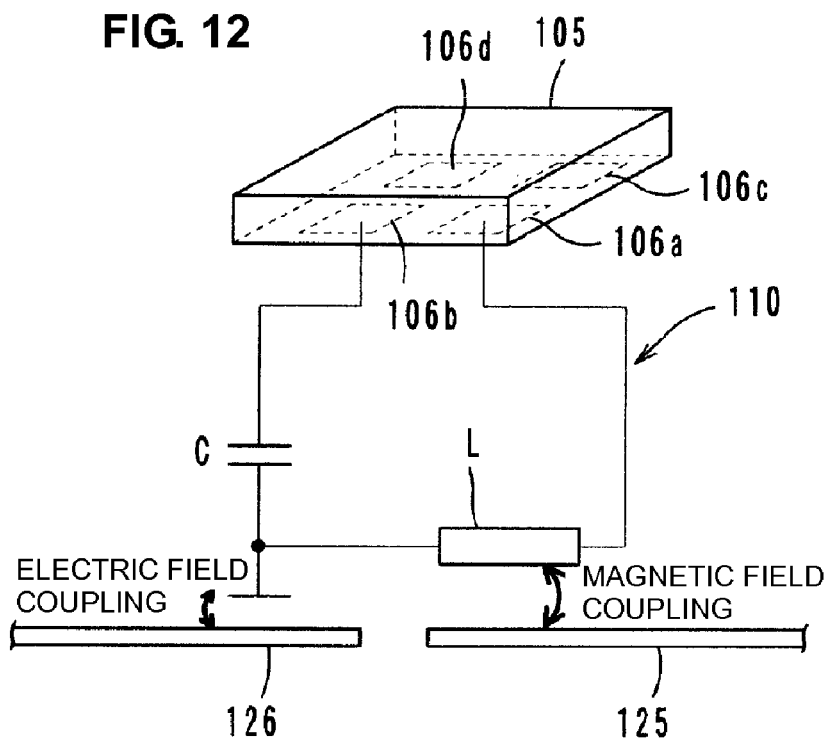
FIG. 12 is an equivalent circuit diagram illustrating a resonance circuit in a feeder circuit substrate.

As shown in FIG. 12, the electromagnetic coupling module 101 includes the radio IC chip 105 and the feeder circuit substrate 110 on which the radio IC chip 105 is mounted. The feeder circuit substrate 110 is attached to the wide portions 125a and 126a of the radiation plates 125 and 126 by an adhesive, for example. The adhesive is preferably made of an insulating material having high permittivity. The radio IC chip 105 includes a clock circuit, a logic circuit, a memory circuit, and other suitable circuits, stores necessary information, and electrically connects to electrodes 112a and 112b (see FIG. 13) provided on a front surface of the feeder circuit substrate 110 via metal bumps. As the material of the metal bumps, Au or solder can preferably be used, for example.

As illustrated in FIG. 12, the inductance element L and the capacitance element C provided in the feeder circuit substrate 110 define a resonance circuit having a predetermined resonance frequency, so as to transmit transmission signals having a predetermined frequency output from the radio IC chip 105 to the radiation plates 125 and 126, to select a reception signal having a predetermined frequency from among signals received by the radiation plates 125 and 126, and to supply the selected reception signal to the radio IC chip 105.

Figure 13:
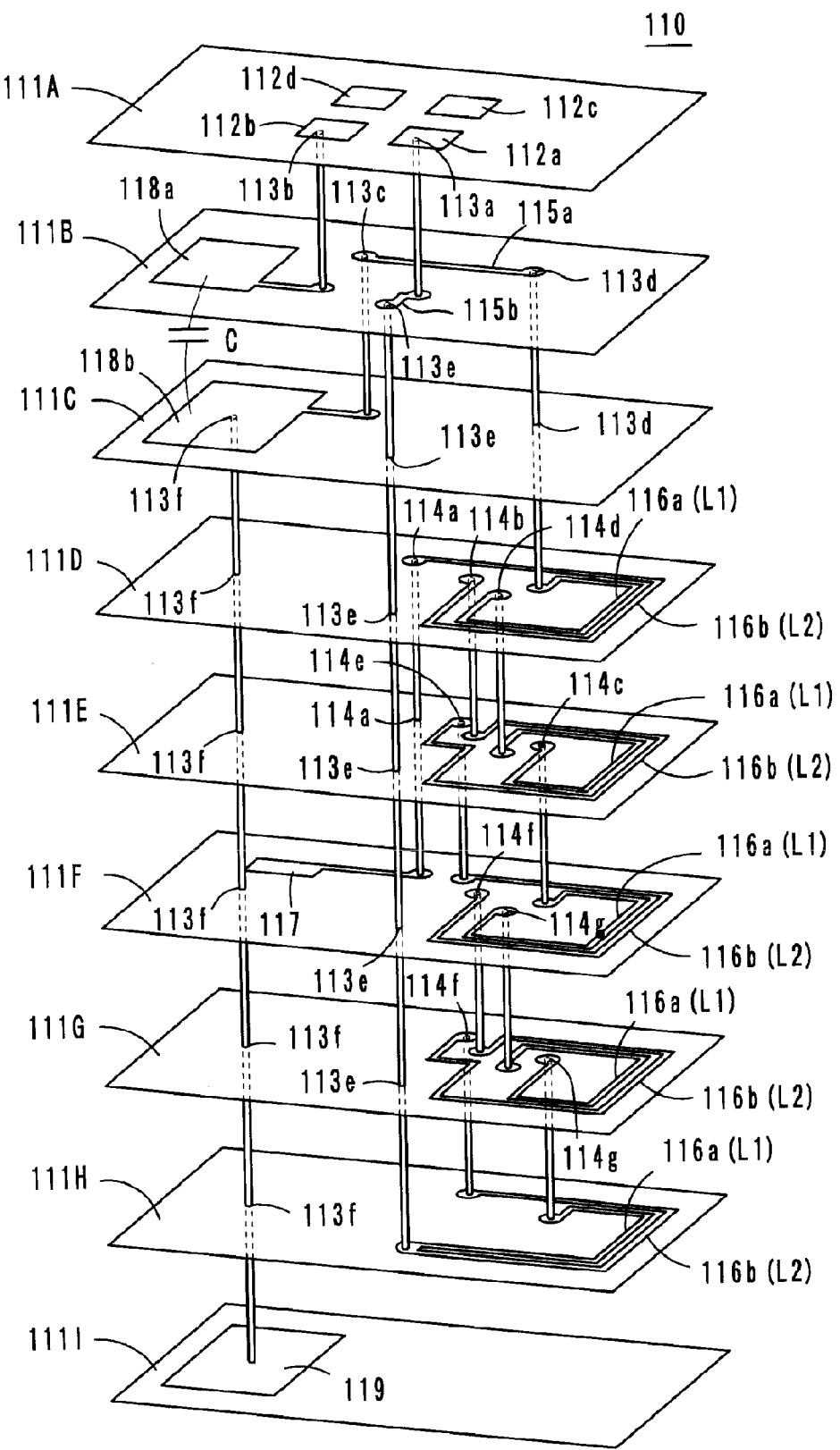
FIG. 13 is an exploded perspective view illustrating the feeder circuit substrate.

More specifically, the feeder circuit substrate 110 is preferably formed by laminating, crimping, and firing ceramic sheets 111A to 111I made of a dielectric material as illustrated in FIG. 13. The sheet 111A is provided with the connecting electrodes 112a and 112b, electrodes 112c and 112d, and via-hole conductors 113a and 113b. The sheet 111B is provided with a capacitor electrode 118a, conductor patterns 115a and 115b, and via-hole conductors 113c to 113e. The sheet 111C is provided with a capacitor electrode 118b and via-hole conductors 113d to 113f. Furthermore, the sheet 111D is provided with conductor patterns 116a and 116b and via-hole conductors 113e, 113f, 114a, 114b, and 114d. The sheet 111E is provided with conductor patterns 116a and 116b and via-hole conductors 113e, 113f, 114a, 114c, and 114e. The sheet 111F is provided with a capacitor electrode 117, conductor patterns 116a and 116b, and via-hole conductors 113e, 113f, 114f, and 114g. The sheet 111G is provided with conductor patterns 116a and 116b and via-hole conductors 113e, 113f, 114f, and 114g. The sheet 111H is provided with conductor patterns 116a and 116b and a via-hole conductor 113f. Furthermore, the sheet 111I is provided with an electrode 119.

By laminating the above-described sheets 111A to 111I, the conductor patterns 116a that are spirally connected via the via-hole conductors 114c, 114d, and 114g define an inductance element L1, the conductor patterns 116b that are spirally connected via the via-hole conductors 114b, 114e, and 114f define an inductance element L2, and the capacitor electrodes 118a and 118b define the capacitance element C.

One end of the inductance element L1 is connected to the capacitor electrode 118b via the via-hole conductors 114c and 113d, the conductor pattern 115a, and the via-hole conductor 113c, and one end of the inductance element L2 is connected to the capacitor electrode 117 via the via-hole conductor 114a. The other ends of the inductance elements L1 and L2 are integrated together on the sheet 111H and are connected to the connecting electrode 112a via the via-hole conductor 113e, the conductor pattern 115b, and the via-hole conductor 113a. Furthermore, the capacitor electrode 118a is electrically connected to the connecting electrode 112b via the via-hole conductor 113b.

In addition, the connecting electrodes 112a and 112b are electrically connected to terminals 106a and 106b (see FIG. 12) of the radio IC chip 105 via metal bumps. The electrodes 112c and 112d are terminating ground terminals and are connected to terminals 106c and 106d of the radio IC chip 105.

In the first preferred embodiment, the inductance element L includes the two conductor patterns 116a and 116b arranged substantially in parallel. The two conductor patterns 116a and 116b preferably have different line lengths (inductances L1 and L2) and may preferably have different resonance frequencies, so that a wide frequency band can be used in the radio IC device. Alternatively, the electrode 119 and the via-hole conductor 113f may preferably be omitted and the capacitor electrode 118b may preferably be directly electrically coupled to the radiation plate 126.

The respective ceramic sheets 111A to 111I may preferably be made of a magnetic ceramic material, for example. The feeder circuit substrate 110 may be easily obtained through a process of manufacturing a multilayer substrate, such as a conventionally-used sheet laminating method or thick-film printing method, for example.

Alternatively, the sheets 111A to 111I may be formed as flexible sheets made of a dielectric material, such as polyimide or liquid crystal polymer, for example, electrodes and conductors may be formed on the sheets by a thick-film forming method or other suitable method, the sheets may be laminated to form a laminate by thermocompression bonding or other suitable method, and the inductance element L (L1 and L2) and the capacitance element C may be provided therein.

In the feeder circuit substrate 110, the inductance element L (L1 and L2) is coupled to the radiation plate 125 through a magnetic field, and the capacitance element C is coupled to the radiation plate 126 through an electric field via the electrode 119. Accordingly, in the electromagnetic coupling module 101, high-frequency signals (e.g., in UHF (ultrahigh frequency) band) radiated from a reader/writer (not illustrated) are received by the radiation plates 125 and 126, the resonance circuit (LC series resonance circuit including the inductance element L and the capacitance element C) that is magnetically and electrically coupled to the radiation plates 125 and 126 resonates, and only reception signals in a predetermined frequency band are supplied to the radio IC chip 105. On the other hand, predetermined energy is extracted from the reception signals, information stored in the radio IC chip 105 is matched to a predetermined frequency in the resonance circuit using the energy as a driving source, transmission signals are supplied to the radiation plates 125 and 126, and then the transmission signals are transmitted and transferred from the radiation plates 125 and 126 to the reader/writer.

In the feeder circuit substrate 110, a resonance frequency characteristic is determined in the resonance circuit including the inductance element L (L1 and L2) and the capacitance element C. The resonance frequency of signals radiated from the radiation plates 125 and 126 is substantially determined by a self-resonance frequency of the resonance circuit. Therefore, it is not necessary to set the location at which the electromagnetic coupling module 101 is attached with high precision, and it is sufficient that the electromagnetic coupling module 101 is attached at the wide portions 125a and 126a of the radiation plates 125 and 126.

Incidentally, the resonance circuit also functions as a matching circuit to achieve impedance matching between the radio IC chip 105 and the radiation plates 125 and 126. The feeder circuit substrate 110 may preferably include a matching circuit that is provided separately from the resonance circuit including the inductance element and the capacitance element. If the function of the matching circuit is added to the resonance circuit, the design of the resonance circuit tends to be relatively complicated. By providing the matching circuit separately from the resonance circuit, each of the resonance circuit and the matching circuit can be independently designed.

Second Preferred Embodiment of Radio IC Device

Figure 14:
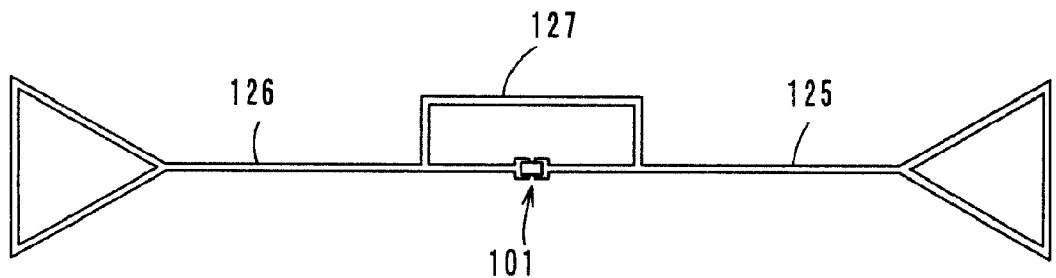
FIG. 14 is a plan view illustrating the radio IC device according to a second preferred embodiment of the present invention.

FIG. 14 illustrates the radio IC device according to a second preferred embodiment of the present invention. This radio IC device has substantially the same configuration as that in the first preferred embodiment. The difference is that a wiring pattern 127 for impedance matching is provided between the radiation plates 125 and 126. The operation and advantages of the second preferred embodiment are substantially the same as those of the first preferred embodiment. If the feeder circuit substrate 110 does not include a matching circuit, impedance matching between the radio IC chip 105 and the radiation plates 125 and 126 can preferably be achieved by the wiring pattern 127. If the feeder circuit substrate 110 includes a matching circuit, the matching circuit in the feeder circuit substrate 110 can be simplified, such that the feeder circuit substrate 110 can be miniaturized.

Third Preferred Embodiment of Radio IC Device

Figure 15:
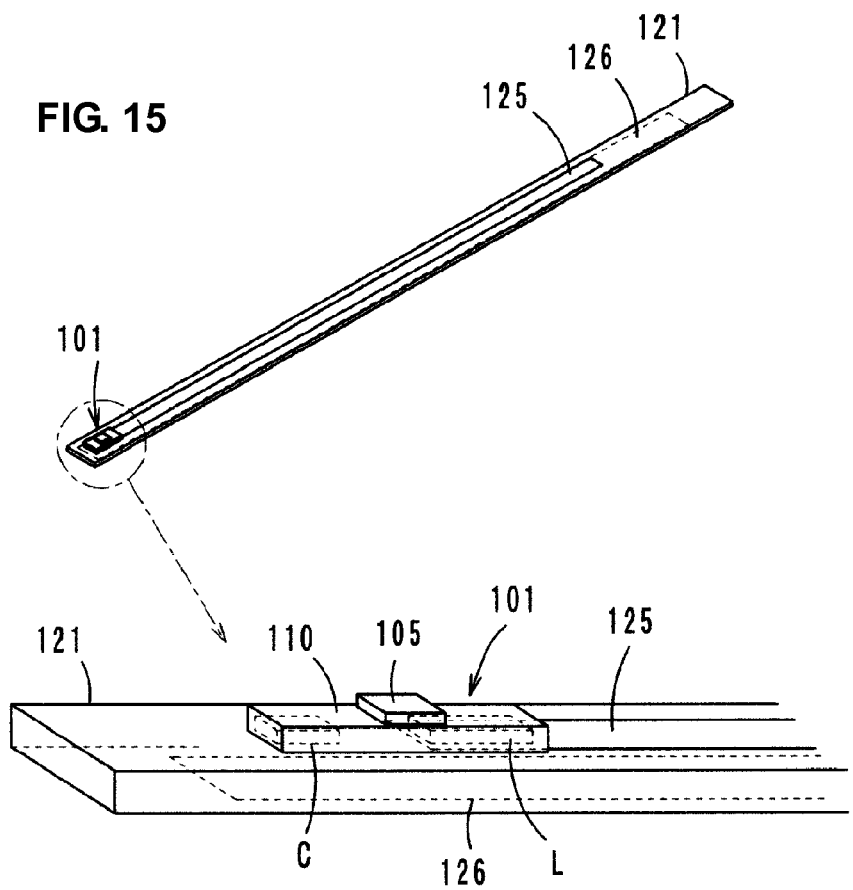
FIG. 15 is a perspective view illustrating the radio IC device according to a third preferred embodiment of the present invention.

FIG. 15 illustrates the radio IC device according to a third preferred embodiment of the present invention. This radio IC device includes the above-described electromagnetic coupling module 101. In addition, the radiation plate 125 that is magnetically coupled to the inductance element L in the feeder circuit substrate 110 is provided on a front surface of a dielectric substrate 121 (e.g., PET film), and the radiation plate 126 that is electrically coupled to the capacitance element C is provided on a rear surface of the dielectric substrate 121.

The operation and advantages of the third preferred embodiment are substantially the same as those of the first preferred embodiment. Particularly, the line length of the radiation plate 125 that is magnetically coupled to the inductance element L is preferably an integral multiple of $\lambda/2$ in the relationship with the resonance frequency $\lambda$, and a preferable radiation characteristic can be obtained. The radiation plates 125 and 126 are arranged in substantially the same orientation, wherein the same directivity can be provided for transmission and reception signals.

Fourth Preferred Embodiment of Radio IC Device

Figure 16:
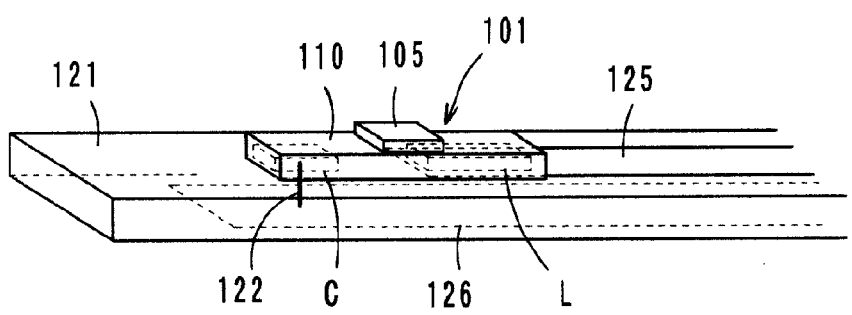
FIG. 16 is a perspective view illustrating the radio IC device according to a fourth preferred embodiment of the present invention.

FIG. 16 illustrates the radio IC device according to a fourth preferred embodiment of the present invention. This radio IC device has substantially the same configuration as that of the above-described third preferred embodiment. The difference is that the radiation plate 126 is directly and electrically connected to an electrode of the capacitance element C via a conductor 122 in the dielectric substrate 121.

In the fourth preferred embodiment, substantially the same operation and advantages as those of the third preferred embodiment can be obtained. In addition, since an electrode of the capacitance element C is directly and electrically connected to the radiation plate 126, electric (capacitive) coupling can be achieved more easily.

Fifth Preferred Embodiment of Radio IC Device

Figure 17:
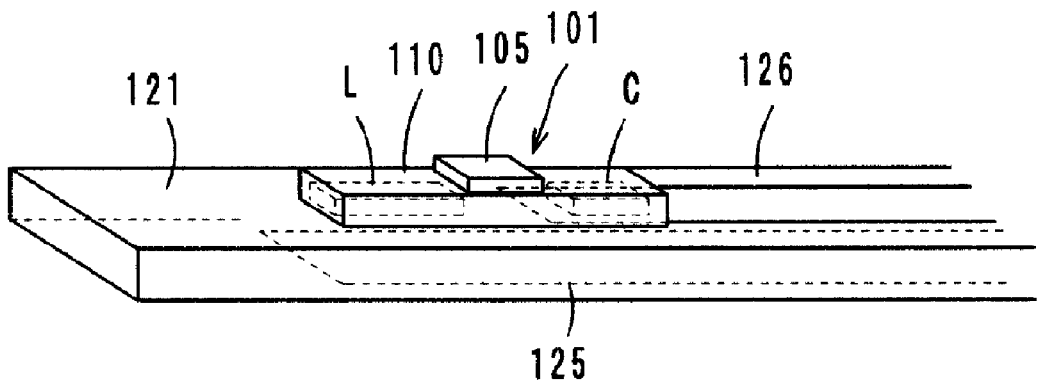
FIG. 17 is a perspective view illustrating the radio IC device according to a fifth preferred embodiment of the present invention.

FIG. 17 illustrates the radio IC device according to a fifth preferred embodiment of the present invention. This radio IC device has substantially the same configuration as that in the third preferred embodiment. The difference is that the electromagnetic coupling module 101 is arranged in an orientation opposite to that in the third preferred embodiment, that the radiation plate 126 that is electrically coupled to the capacitance element C is arranged on the front surface of the dielectric substrate 121, and that the radiation plate 125 that is magnetically coupled to the inductance element L is arranged on the rear surface of the dielectric substrate 121. The operation and advantages of the fifth preferred embodiment are substantially the same as those of the above-described third preferred embodiment.

Sixth Preferred Embodiment of Radio IC Device

Figure 18:
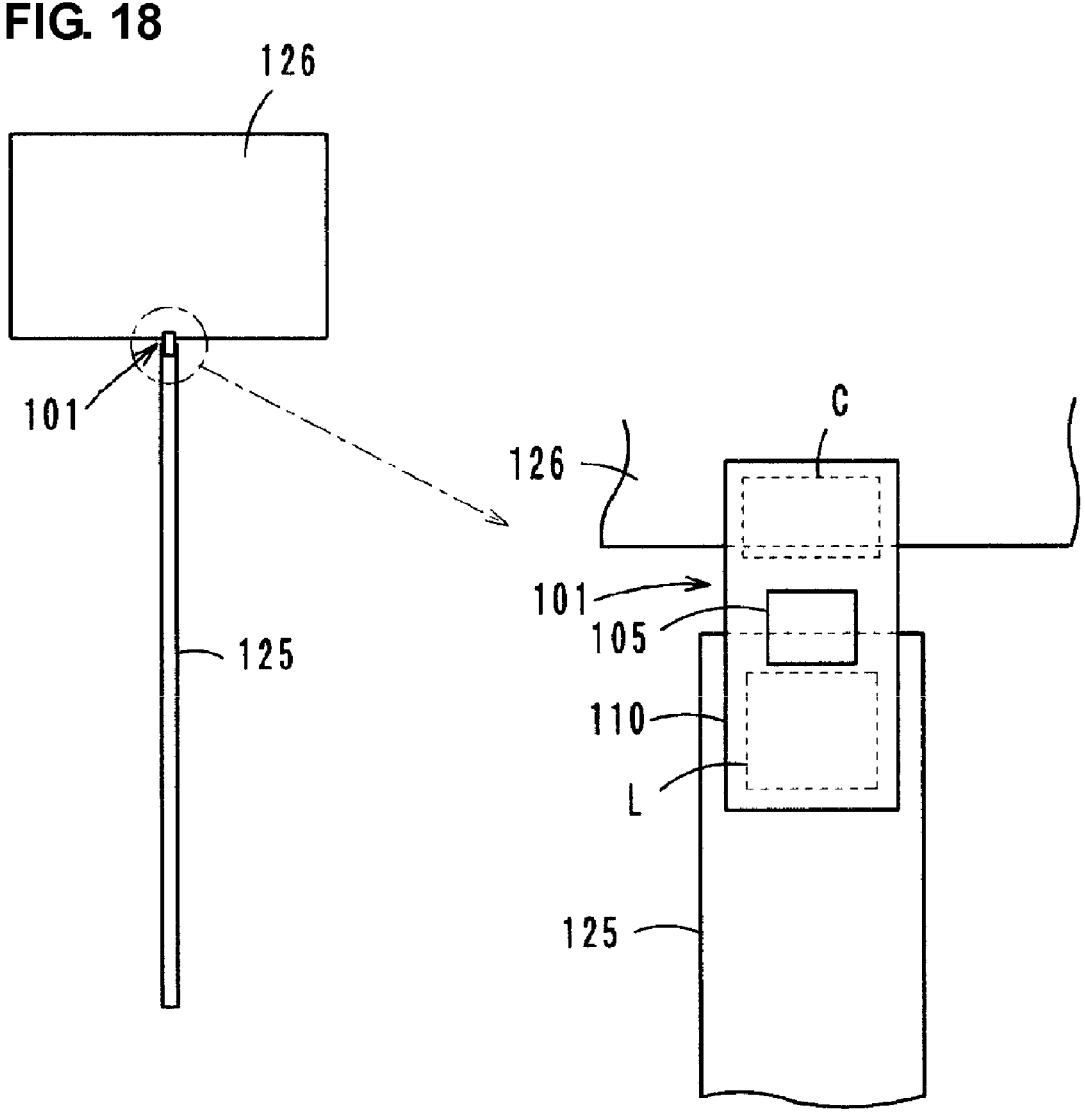
FIG. 18 is a plan view illustrating the radio IC device according to a sixth preferred embodiment of the present invention.

FIG. 18 illustrates the radio IC device according to a sixth preferred embodiment of the present invention. This radio IC device includes the above-described electromagnetic coupling module 101. In addition, the radiation plate 125 that is magnetically coupled to the inductance element L is defined by a line electrode having a line length of an integral multiple of λ/2, and the radiation plate 126 that is electrically coupled to the capacitance element C is defined by a large-area electrode.

The radiation plate 126 is electrically coupled to the capacitance element C by capacitance, and thus, the radiation characteristic thereof does not depend on a change in phase in the radiation plate 126, such that the shape of the radiation plate 126 can be relatively freely selected. Therefore, the shape of the radiation plate 126 can be designed relatively freely, and an improved radiation characteristic can be obtained by increasing the area thereof. The other operation and advantages of the sixth preferred embodiment are substantially the same as those of the first preferred embodiment.

Seventh Preferred Embodiment of Radio IC Device

Figure 19:
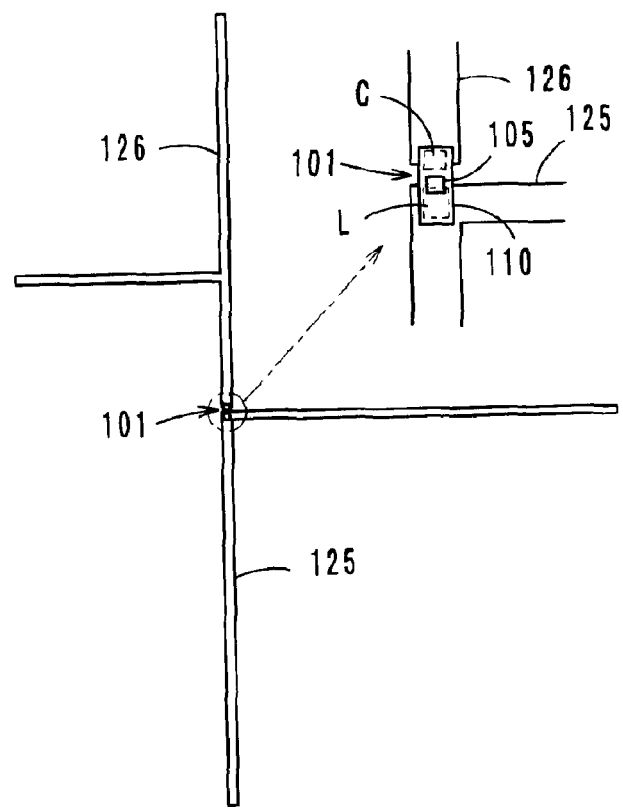
FIG. 19 is a plan view illustrating the radio IC device according to a seventh preferred embodiment of the present invention.

FIG. 19 illustrates the radio IC device according to a seventh preferred embodiment of the present invention. This radio IC device includes the above-described electromagnetic coupling module 101. In addition, the radiation plate 125 that is magnetically coupled to the inductance element L is branched at the root, and the radiation plate 126 that is electrically coupled to the capacitance element C is branched at a middle portion in the longitudinal direction.

Figure 20:
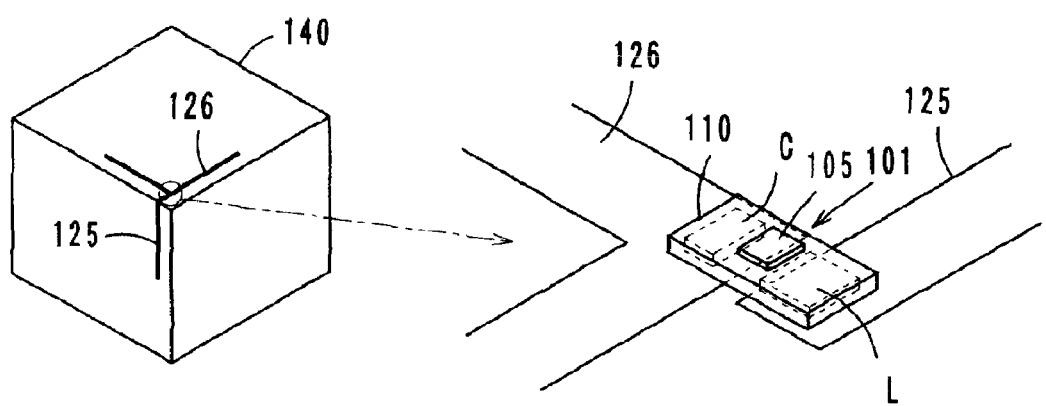
FIG. 20 is a perspective view illustrating a state in which the radio IC device of the seventh preferred embodiment is attached to a container.

The branched radiation plates 125 and 126 according to the seventh preferred embodiment enable the directivity of transmission/reception signals to be improved. In addition, as illustrated in FIG. 20, the required directivity can be ensured when the radio IC device is attached to a corner portion of a three-dimensional object 140, such as cardboard, for example. The other operation and advantages of the seventh preferred embodiment are substantially the same as those of the first preferred embodiment.

First Modification of Feeder Circuit Substrate

Figure 21:
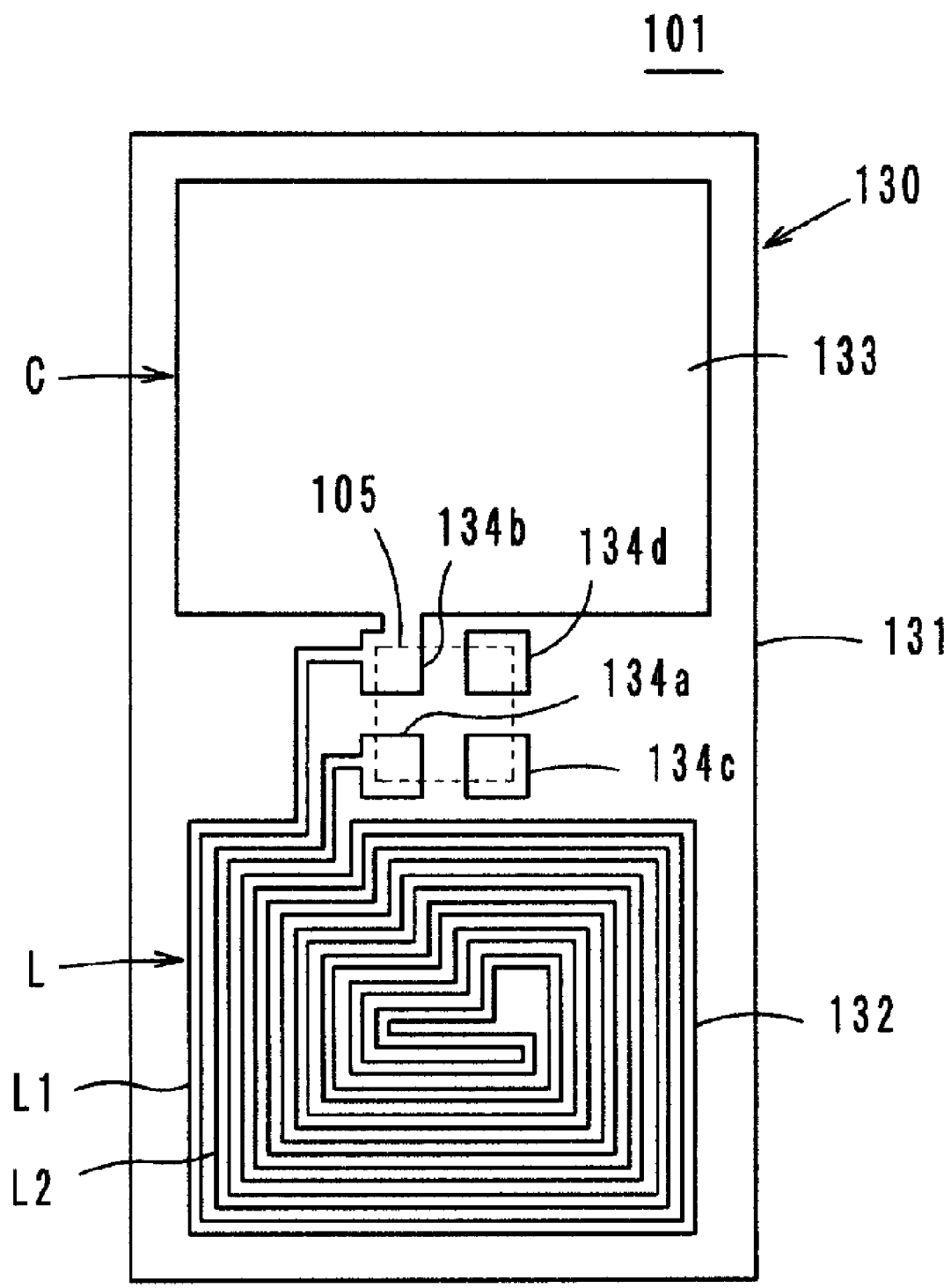
FIG. 21 is a plan view illustrating a first modification of the feeder circuit substrate.

FIG. 21 illustrates a first modification of the feeder circuit substrate defining the electromagnetic coupling module 101. The feeder circuit substrate 130 includes a flexible dielectric substrate 131, such as a PET film, for example, and a spiral conductor pattern 132 defining an inductance element L and a capacitor electrode 133 defining a capacitance element C arranged on the dielectric substrate 131. Electrodes 134a and 134b extending from the conductor pattern 132 and the capacitor electrode 133 correspond to the connecting electrodes 112a and 112b illustrated in FIG. 13 and are electrically connected to the terminals 106a and 106b of the radio IC chip 105. In addition, electrodes 134c and 134d disposed on the substrate 131 are terminating ground terminals and are electrically connected to the terminals 106c and 106d of the radio IC chip 105.

In the feeder circuit substrate 130, the inductance element L and the capacitance element C define a resonance circuit and are magnetically and electrically coupled to the facing radiation plates, respectively, such that high-frequency signals of a predetermined frequency are transmitted/received. Therefore, the operation and advantages of the radio IC device including the feeder circuit substrate 130 according to the first modification are substantially the same as those of the above-described first preferred embodiment. Particularly, in the first modification, since the feeder circuit substrate 130 is defined by the flexible substrate 131, the radio IC device has a low profile and can be attached to a radiation plate having a curved surface. Furthermore, the inductance value of the inductance element L can be changed by changing the width and interval of the line of the conductor pattern 132, such that the resonance frequency can be precisely adjusted.

In the inductance element L according to the first modification, as in the above-described first preferred embodiment, two electrodes (conductor pattern 132) extending from the electrodes 134a and 134b are spirally arranged and the two electrodes are connected to each other at the approximate center of the spiral. The two electrodes have different inductance values of L1 and L2, which enables the respective resonance frequencies to have different values. Accordingly, a wide usable frequency band can be provided to the radio IC device.

Second Modification of Feeder Circuit Substrate

Figure 22:
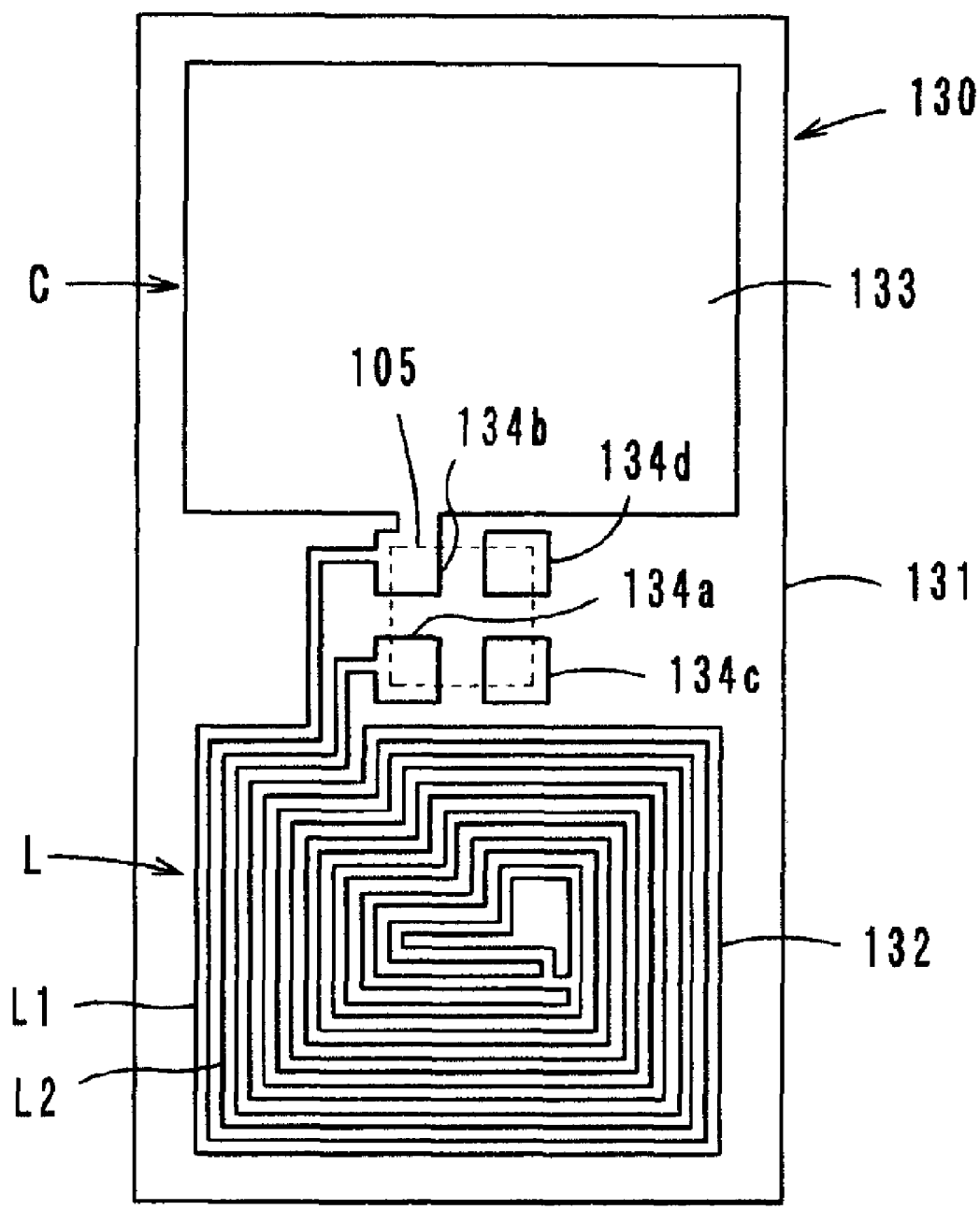
FIG. 22 is a plan view illustrating a second modification of the feeder circuit substrate.

FIG. 22 illustrates a second modification of the feeder circuit substrate defining the electromagnetic coupling module. This feeder circuit substrate 130 has substantially the same configuration as that in the above-described first modification. The difference is that the shape of a center portion of the conductor pattern 132 defining the inductance element L is changed and the values of the inductances L1 and L2 are changed. The operation and advantages thereof are substantially the same as those of the first modification.

Third Modification of Feeder Circuit Substrate

Figure 23:
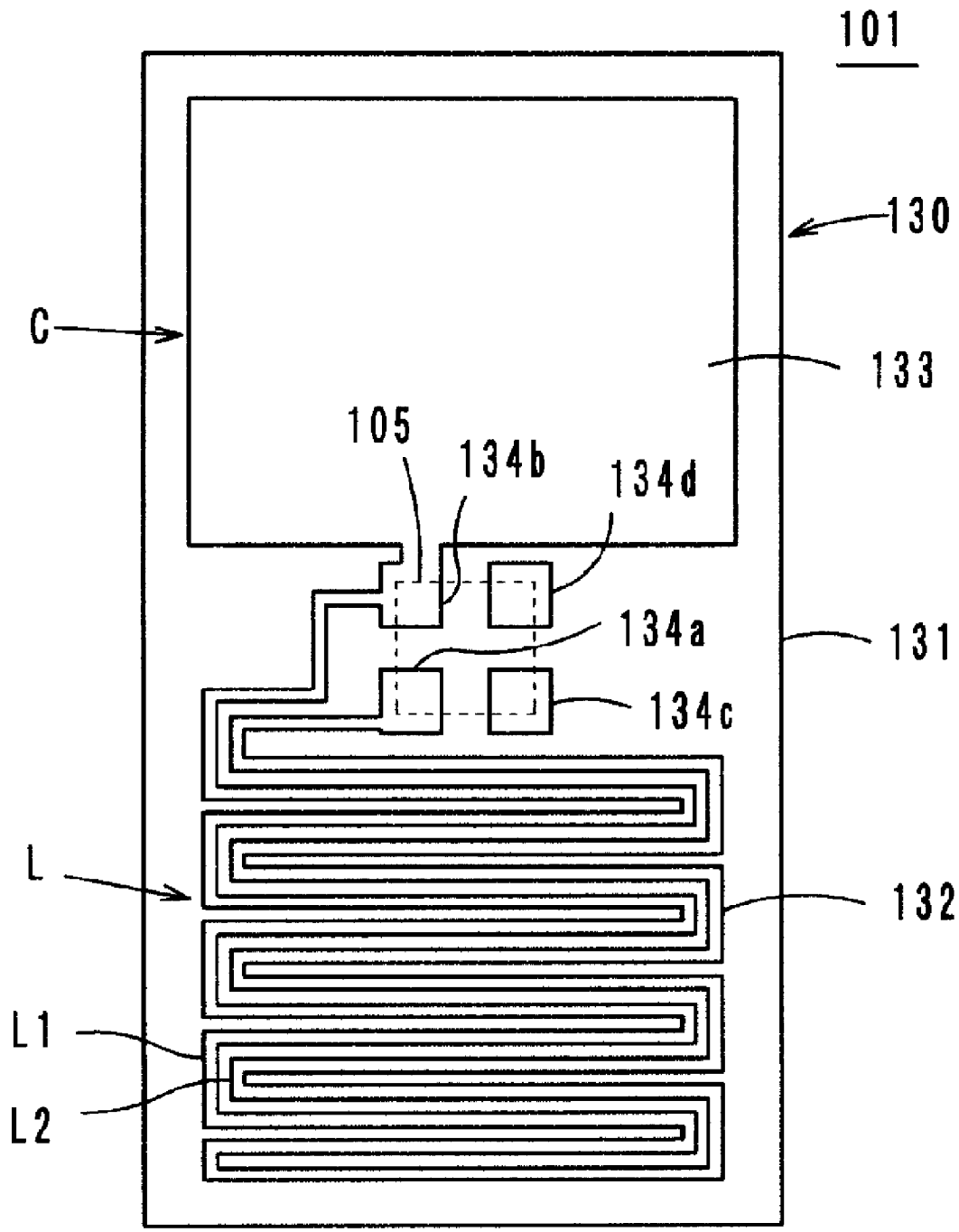
FIG. 23 is a plan view illustrating a third modification of the feeder circuit substrate.

FIG. 23 illustrates a third modification of the feeder circuit substrate defining the electromagnetic coupling module. In this feeder circuit substrate 130, the conductor pattern 132 defining the inductance element L has a meander pattern. Other than this difference, the configuration is substantially the same as that in the above-described first modification. In addition, the operation and advantages thereof are substantially the same as those of the first modification.

In the inductance element L according to the third modification, as in the above-described first preferred embodiment, the two electrodes (conductor pattern 132) extending from the electrodes 134a and 134b are arranged in a meander pattern and the ends of the respective electrodes are connected to each other. The two electrodes have different inductance values of L1 and L2, which enables the respective resonance frequencies to be set to different values. Accordingly, a wide usable frequency band can be provided to the radio IC device.

Fourth Modification of Feeder Circuit Substrate

Figure 24:
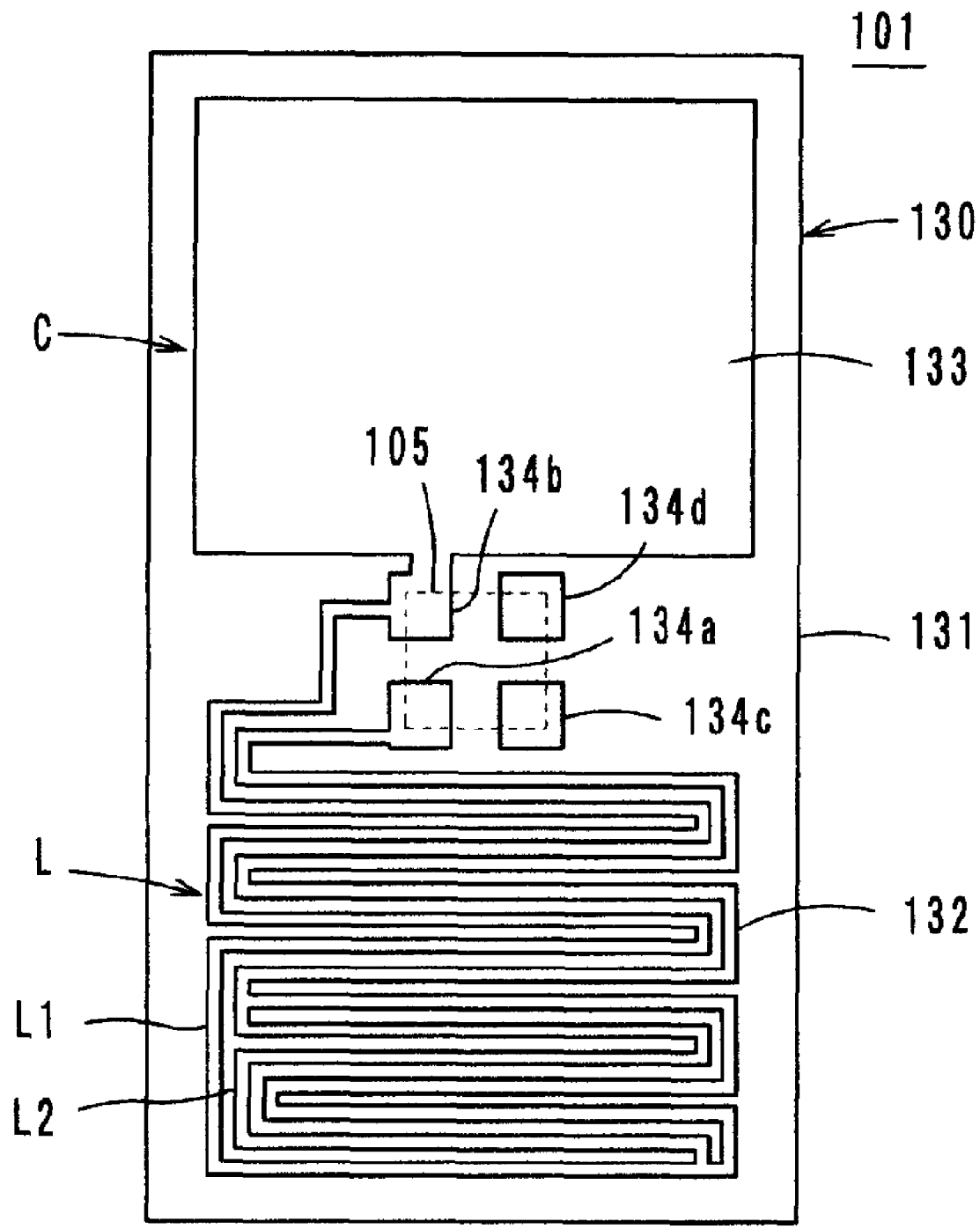
FIG. 24 is a plan view illustrating a fourth modification of the feeder circuit substrate.

FIG. 24 illustrates a fourth modification of the feeder circuit substrate defining the electromagnetic coupling module. This feeder circuit substrate 130 has substantially the same configuration as that in the above-described third modification. The difference is that two branches are provided at a predetermined location of the wiring electrodes of the inductances L1 and L2 defining the inductance element L. By further branching the inductance L2 in this manner, a greater difference can be produced in the inductance values, and the degree of freedom in designing a usable frequency band can be increased. The other operation and advantages are substantially the same as those of the third modification.

The antenna and radio IC device according to preferred embodiments of the present invention are not limited to the above-described preferred embodiments and modifications, and can be changed within the scope of the present invention.

For example, the details of the internal configuration of the antenna substrate and the specific shape of the radiation plates can be arbitrarily designed. Particularly, the configuration of the resonance circuit can be arbitrarily designed, and various shapes and arrangements can be used for the inductance element and capacitance element.

The materials of the radiation plates 125 and 126, the film 120, and the substrates 121 and 131 described in the preferred embodiments are only examples, and any suitable materials can be used as long as the materials have a necessary characteristic. In addition, a process other than the metal bumps may be used to connect the radio IC chip to the radiation plates.

The branch shape of the radiation plates 125 and 126 illustrated in FIG. 19, and a winding direction, the number of turns, and the number of foldings of the conductor pattern 132 illustrated in FIGS. 21 to 24 can be arbitrarily set.

As described above, preferred embodiments of the present invention are useful in an antenna and are particularly useful in that electromagnetic waves can be efficiently transmitted/received. In addition, preferred embodiments of the present invention are useful for a radio IC device and are particularly useful in that assembly can be easily performed and desired radiation characteristic and directivity can be obtained.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. An antenna comprising:
    a feeder terminal;
    a resonance circuit including at least a capacitance element and an inductance element;
    a first radiation element electromagnetically coupled to the capacitance element; and
    a second radiation element electromagnetically coupled to the inductance element; wherein
    one of the first radiation element or the second radiation element is substantially circular and includes an end directly connected to the other one of the first radiation element or the second radiation element.

2. The antenna according to claim 1, further comprising an antenna substrate including the resonance circuit.

3. The antenna according to claim 2, wherein the feeder terminal is arranged on a first principal surface of the antenna substrate and the first and second radiation elements are arranged on a second principal surface of the antenna substrate.

4. The antenna according to claim 2, wherein the capacitance element and the inductance element are included in the antenna substrate and arranged substantially parallel to each other.

5. The antenna according to claim 1, wherein the resonance circuit comprises a plurality of resonance circuits.

6. A radio IC device comprising:
    a radio IC chip arranged to process transmission and reception signals;
    a feeder circuit substrate including an inductance element electrode and a capacitance element electrode defining a resonance circuit, the electrodes being arranged at different locations in a plan perspective view;
    a first radiation plate arranged to face the inductance element electrode; and
    a second radiation plate arranged to face the capacitance element electrode; wherein
    the radio IC chip is mounted on the feeder circuit substrate, to define an electromagnetic coupling module; and
    the radio IC chip is operated by signals received by the first and second radiation plates and a response signal from the radio IC chip is radiated from the first and second radiation plates to outside.

7. The radio IC device according to claim 6, wherein an area of the second radiation plate is greater than that of the first radiation plate.

8. The radio IC device according to claim 6, wherein the first radiation plate has a line length of an integral multiple of a half wavelength of a resonance frequency of the radio IC device.

9. The radio IC device according to claim 6, wherein the first and second radiation plates are arranged such that longitudinal sides of the radiation plates are in substantially the same orientation.

10. The radio IC device according to claim 6, wherein at least one of the first and second radiation plates branches at an approximate middle portion in a longitudinal direction thereof.

11. The radio IC device according to claim 6, wherein at least one of the first and second radiation plates branches at a root portion with a predetermined angle.

12. The radio IC device according to claim 6, wherein the feeder circuit substrate comprises a multilayer substrate.

13. The radio IC device according to claim 6, wherein the feeder circuit substrate comprises a flexible substrate.

* * * * *